(12) United States Patent
Ramachandran et al.

(10) Patent No.: US 6,690,914 B2
(45) Date of Patent: Feb. 10, 2004

(54) MULTI-AGENT COLLABORATIVE ARCHITECTURE FOR PROBLEM SOLVING AND TUTORING

(75) Inventors: Surya Ramachandran, Oak Park, IL (US); Anand Kancherlapalli, Oak Park, IL (US)

(73) Assignee: Aidentity Matrix Medical, Inc., Elmhurst, IL (US)

( * ) Notice: Subject to any disclaimer, the term of this patent is extended or adjusted under 35 U.S.C. 154(b) by 255 days.

(21) Appl. No.: 10/036,963

(22) Filed: Dec. 21, 2001

(65) Prior Publication Data

US 2002/0107826 A1 Aug. 8, 2002

Related U.S. Application Data

(60) Provisional application No. 60/257,996, filed on Dec. 22, 2000.

(51) Int. Cl.⁷ .................................................. G09B 5/00
(52) U.S. Cl. ........................ 434/350; 434/118; 434/323; 434/362
(58) Field of Search ................................ 434/118, 169, 434/185, 307 R, 308, 322–324, 335, 350, 362, 365; 706/11, 45, 49, 927; 707/4; 345/428, 592, 639, 705, 733

(56) References Cited

U.S. PATENT DOCUMENTS

| | | |
|---|---|---|
| 4,370,983 A | 2/1983 | Lichtenstein |
| 4,464,172 A | 8/1984 | Lichtenstein |
| 4,731,725 A | 3/1988 | Suto et al. |
| 4,733,354 A | 3/1988 | Potter et al. |
| 4,752,879 A | 6/1988 | Brunnett |
| 4,835,690 A | 5/1989 | Gangarosa et al. |
| 4,839,822 A | 6/1989 | Dormond et al. |
| 4,945,476 A | 7/1990 | Bodick et al. |
| 5,005,143 A | 4/1991 | Altschuler et al. |
| 5,101,362 A | 3/1992 | Simoudis |
| 5,235,510 A | 8/1993 | Yamada et al. |
| 5,255,187 A | 10/1993 | Sorensen |
| 5,260,871 A | 11/1993 | Goldberg |
| 5,307,452 A * | 4/1994 | Hahn et al. ................. 345/592 |
| 5,311,422 A | 5/1994 | Loftin et al. |
| 5,437,278 A | 8/1995 | Wilk |
| 5,448,722 A * | 9/1995 | Lynne et al. ................. 706/49 |
| 5,455,890 A | 10/1995 | Wang |
| 5,463,548 A | 10/1995 | Asada et al. |
| 5,486,999 A | 1/1996 | Mebane |
| 5,551,436 A | 9/1996 | Yago |
| 5,584,024 A * | 12/1996 | Shwartz ......................... 707/4 |
| 5,597,312 A | 1/1997 | Bloom et al. |
| 5,666,953 A | 9/1997 | Wilk |
| 5,687,716 A | 11/1997 | Kaufmann et al. |
| 5,727,950 A * | 3/1998 | Cook et al. ................. 434/350 |
| 5,769,074 A | 6/1998 | Barnhill et al. |
| 5,769,787 A | 6/1998 | Lemelson |

(List continued on next page.)

Primary Examiner—Joe H. Cheng
(74) Attorney, Agent, or Firm—Piper Rudnick LLP

(57) ABSTRACT

An architecture for a computer system for problem solving and tutoring includes multiple domain dependent agents, each having a knowledge base, multiple domain independent agents and dedicated blackboards assigned to each agent. The agents communicate with their dedicated blackboards via a transmission control protocol/internet protocol (TCP/IP) links and messages are moved between the blackboards by a blackboard agent. The domain independent agents include a control agent that passes a token between the agents. An agent may function only when it has the token. The domain independent agents also include a user interface agent, a database agent and a tutoring agent. Training/testing data repository and student databases are also present. The latter stores information regarding student actions during testing or tutoring sessions. The architecture may be employed on multiple machines to permit geographically diverse users to simultaneously role-play.

20 Claims, 19 Drawing Sheets

U.S. PATENT DOCUMENTS

| | | |
|---|---|---|
| 5,807,256 A | 9/1998 | Taguchi et al. |
| 5,823,948 A | 10/1998 | Ross, Jr. et al. |
| 5,823,949 A | 10/1998 | Goltra |
| 5,836,877 A | 11/1998 | Zavislan |
| 5,839,438 A | 11/1998 | Graettinger et al. |
| 5,865,744 A | 2/1999 | Lemelson |
| 5,870,768 A | 2/1999 | Hekmatpour |
| 5,875,258 A | 2/1999 | Ortyn et al. |
| 5,878,746 A | 3/1999 | Lemelson et al. |
| 5,883,935 A | 3/1999 | Habraken et al. |
| 5,908,383 A | 6/1999 | Brynjestad |
| 6,014,134 A * | 1/2000 | Bell et al. .................. 345/705 |

* cited by examiner

MULTI-AGENT COLLABORATIVE ARCHITECTURE FOR PROBLEM SOLVING AND TUTORING

CLAIM OF PRIORITY

This application claims priority from U.S. Provisional Patent Application Ser. No. 60/257,996, filed Dec. 22, 2000.

BACKGROUND OF THE INVENTION

The present invention relates generally to systems for tutoring and problem solving and, more particularly, to a multi-agent collaborative architecture for a computer system for tutoring and problem solving.

Computer systems that provide scenario-based training for individuals are known. Such a system is illustrated by U.S. Pat. No. 5,597,312 (BLOOM et al.). In addition, systems that provide computer-assisted tutoring in the medical field are also known. Such a system is disclosed in U.S. Pat. No. 4,945,476 (BODICK et al.). These systems, however, fail to take advantage of the benefits of "blackboard" computer system architectures.

The word "blackboard," as used with reference to computer system architectures, came to be borrowed from the medical trauma domain where for a long time trauma doctors have diagnosed and treated patients coming into the hospital. Patients who come into a trauma ward often have serious injuries or illnesses and require immediate attention. In such instances, it is impossible for a single physician to handle the entire task of treating the patient. This is because each physician is an expert in a particular area and that no one single area is enough to diagnose and treat the patient. So, there must be a consorted effort on the part of a team of doctors to handle patients. If the doctors were all to grab at the patient and start their diagnosis/findings or speak at the same time while communicating their diagnosis/findings the result would be chaos (or the loss of information possibly leading to a misdiagnosis).

The system invented to keep order was to have a white note pad that was attached to the stretcher of the patient on which each doctor wrote his diagnosis/findings and what tests and medication was recommended so that each doctor could see what all the other previous doctors had said and prescribed. This was extremely important because of the conflicts in treatment and diagnosis. Further, it was very important to maintain an order in which the patent was reviewed (i.e.: the brain specialist would need blood pressure information etc. before he could pass a diagnosis or post his findings). This general scheme of distributed co-operative problem solving came to be adopted by the field of artificial intelligence (AI) under the broad term of blackboard architectures.

Computer systems that employ blackboard architectures to provide tutoring and diagnosis/problem solving exist in the prior art. For example, U.S. Pat. No. 5,448,722 (LYNNE et al.) shows that computer-based diagnostic systems using both multiple electronic blackboards and diagnostic modules are known. Indeed, U.S. Pat. No. 5,101,362 (SIMOUDIS) states that typical expert systems include a knowledge base, a working memory, which is also termed a "blackboard", and a control portion or inference engine. The Simoudis '362 patent illustrates an expert system with multiple knowledge sources effectively performing operations on data present in the blackboard.

The patents cited and described above, however, fail to disclose an architecture that employs multiple agents and blackboards in a tutorial application. A need thus exists for an architecture that can provide the advantages and benefits of multi-agent collaborative processing in a tutorial environment. More specifically, a need exists for an architecture for a tutoring system that employs multiple agents and blackboards and that includes a tutoring agent, a student database, a training/testing database and multiple domain dependent agents, with each of the domain dependent agents having expertise in a specific field (domain).

In addition, prior art tutoring systems tend to be information-centric as opposed to user-centric. User-centric systems may be tuned to cater more to a specific user's needs and thus provide a user with a greater retention of information. A need thus exists for an architecture that may enable a tutoring system to be user-centric.

Many prior art systems are also difficult to modify and update. Often the complete system software must be downloaded and/or replaced. A system with a modular architecture featuring numerous agents permits ease of updating and modification in that specific agents may be modified or updated independently or entire agents may be added or eliminated altogether. In addition, a modular architecture facilitates role-playing in that users may be easily substituted for agents of the system.

Many prior art systems also do not employ transmission control protocol/internet protocol (TCP/IP) links to permit the architecture agents to communicate with one another. Such an arrangement provides the capability for geographically diverse users to access the system simultaneously for role-playing or other interaction.

Accordingly, it is an object of the present invention to provide an architecture for problem solving and tutoring that features multiple agents and blackboards.

It is another object of the present invention to provide an architecture for problem solving and tutoring that is user-centric.

It is another object of the present invention to provide an architecture for problem solving that is modular.

It is still another object of the present invention to provide an architecture that uses TCP/IP links to provide communication between its agents.

SUMMARY OF THE INVENTION

The present invention is an architecture for a system for tutoring and problem solving that includes a number of domain dependent agents, each including a knowledge base, a number of domain independent agents and a number of blackboards. One of each of the blackboards is assigned or dedicated to one of each of the domain dependent agents or domain independent agents. A blackboard agent transfers messages between the blackboards so that the domain dependent and domain independent agents may communicate with one another by posting messages to and reading messages from their dedicated blackboards. The domain dependent agents and domain independent agents communicate with their dedicated blackboards through transmission control protocol/internet protocol links During a session, a token is generated and the domain independent agents include a control agent that selectively passes the token between the domain dependent and domain independent agents so that each functions only when it has the token. The domain independent agents also include a tutoring agent that communicates with the domain dependent and domain independent agents through the blackboards to enable a user of the computer system to select between the domain dependent agents for a tutoring session.

The architecture also includes a student database and a training/testing data repository or database and the plurality of domain independent agents include a database agent. The database agent provides data to the domain dependent and domain independent agents from the databases through the blackboards and receives data from the domain dependent and domain independent agents for posting on the student database. As a result, the actions of users during tutoring sessions may be recorded on the student database for tracking and future use.

The architecture also includes a user display and a graphical front-end, and the independent agents also include a user interface agent, for displaying information to the user, including data from the domain dependent agent knowledge bases and the training/testing data repository. In addition, the user interface agent also receives inputs from a user and directs them to appropriate domain dependent and domain independent agents through the blackboards.

The tutoring system may be installed on more than one computer which enables geographically diverse users to simultaneously role-play during a tutoring session.

The following detailed description of embodiments of the invention, taken in conjunction with the accompanying drawings, provide a more complete understanding of the nature and scope of the invention.

DESCRIPTION OF THE PREFERRED EMBODIMENTS

The architecture of the present invention is based upon the concept that, in an environment for complex problem solving, it is advantageous, and indeed sometimes critical, to have a number of agents or knowledge sources that collaborate by lending their expertise in achieving the overall goal or solution. In addition, in computer systems that provide training and diagnosis assistance for complex fields such as Positron Emission Tomography (PET), Nuclear Medicine and Magnetic Resonance Imaging (MRI), it is important that the system architecture not only support tutoring but also capture the problem solving process itself. The architecture of the present invention incorporates these concepts to provide a system that facilitates problem solving, tutoring, critiquing and testing through a collaboration of multiple agents over a broad range of subjects or domains.

The architecture of the present invention uses multiple agents and the expertise that they have. The domain dependent agents of the architecture of the present invention may be thought of as experts working together to solve a problem or provide tutoring. An advantage of having this multi-agent environment is that a distributed computation model may be achieved while still maintaining some centralized control of the overall system.

Another advantage of the architecture of the present invention is that problem solving or training is user-centric rather than being information-centric. That is, the entire architecture is tuned to catering to a specific user's skills and needs. All information (problem solving, training, testing or otherwise) is modified to fit the individual user. This ensures that the system is much more effective in tutoring or assisting the user with a diagnosis.

Figure 1:
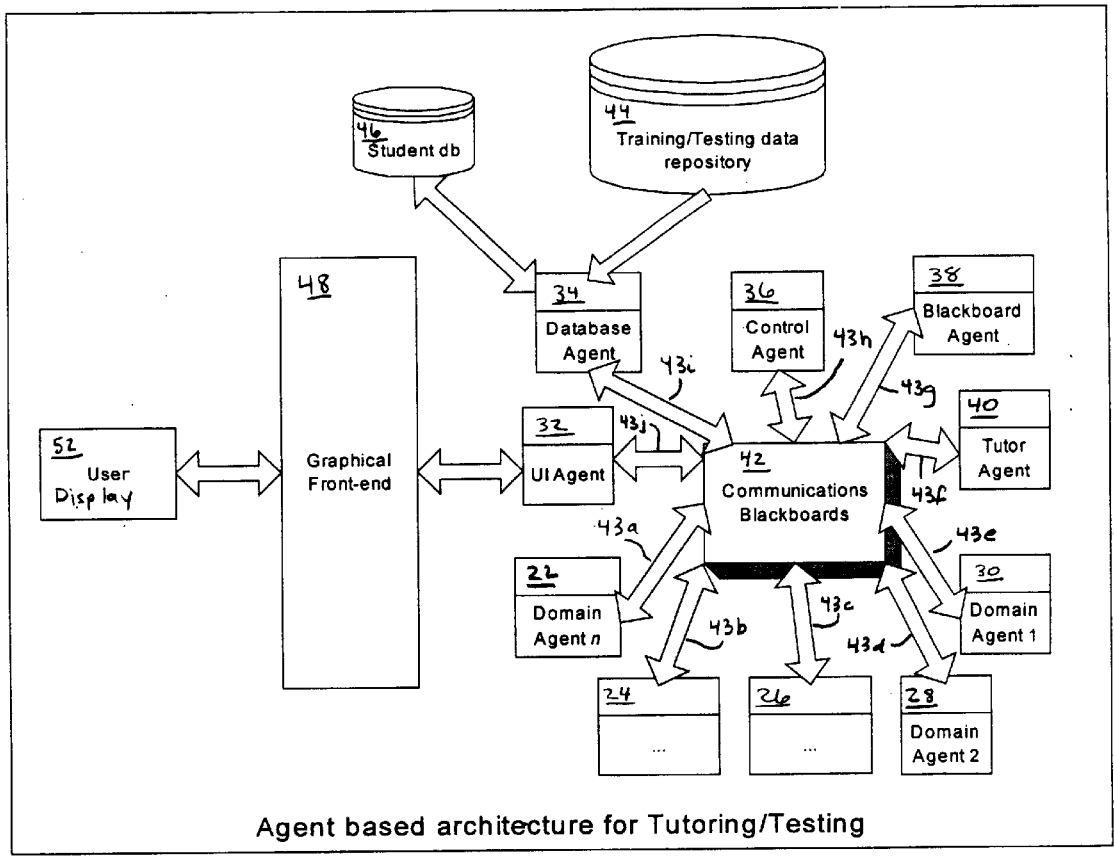
FIG. 1 is a schematic of a tutoring system featuring an embodiment of the architecture of the present invention.

A computerized tutoring system employing an embodiment of the architecture of the present invention is indicated in general at 20 in FIG. 1. It is to be understood that while the architecture of the present invention is described below in terms of a tutoring system, the architecture may be employed in computer systems that provide problem solving assistance including, but not limited to, systems that provide parallel diagnosis for medical diagnostic equipment.

As illustrated in FIG. 1, the tutoring system 20 features an architecture that includes domain dependent agents 1-n, illustrated at 22, 24, 26, 28 and 30 as well as a user interface (UI) agent 32, a database agent 34, a control agent 36, a blackboard agent 38 and a tutor agent 40. Each agent, whether it be domain dependent or domain independent, is an individual executable program or software module. As will be explained below, the agents all communicate with one another through blackboards 42 with each agent having its own independent, dedicated blackboard. As will be described in greater detail, each agent communicates with its dedicated blackboard through transmission control protocol/internet protocol (TCP/IP) links 43a–43j.

The database agent communicates with a training/testing data repository or data base 44 and a student database 46. These databases may take many forms and may utilize a variety of storage devices. For example, the training/testing database, which is comprised of static data, may be loaded onto compact discs (CDs) and read from a CD ROM drive.

The UI agent communicates with the graphical front-end of the system 48 which formats and presents screens of information to a user via the user display 52.

The tutoring system 20 of FIG. 1 may be loaded onto a single computer or multiple computers. In the latter case, the multiple computers may communicate with one another so that the system may allow users in geographically diverse locations to roll play with one another during training scenarios. As will be explained, when multiple computers are joined, the architecture of the present invention permits distributed processing, however, also provides centralized control of the system of joined computers.

The domain independent and dependent agents and other components of the architecture of FIG. 1 will now be discussed.

Domain Independent Agents

Figure 2:
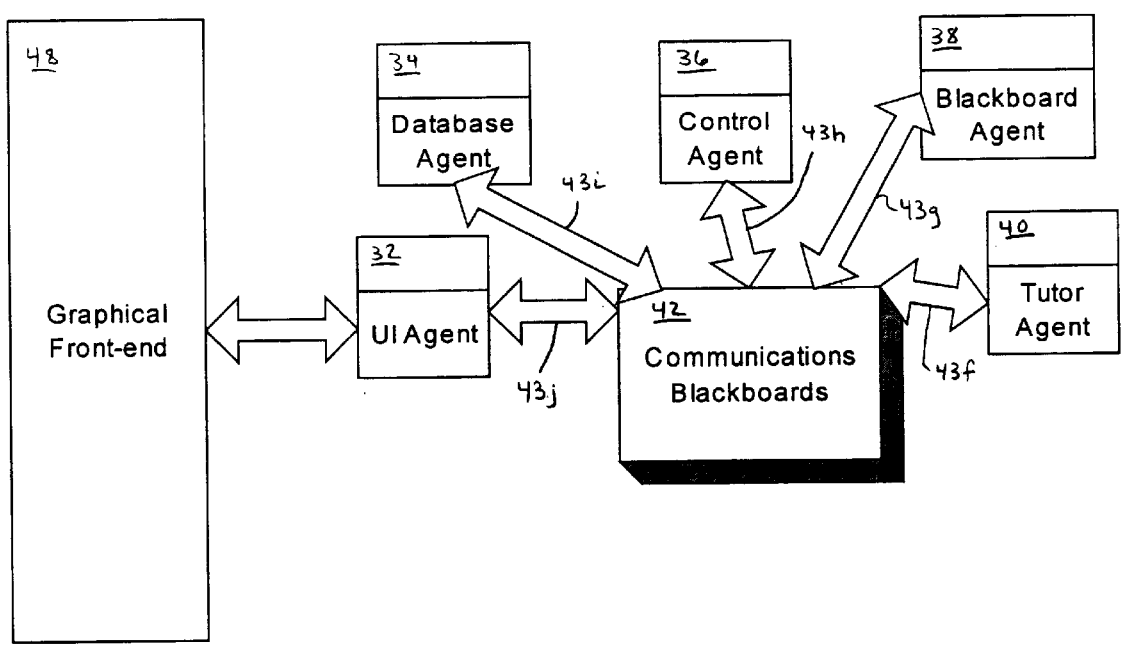
FIG. 2 is a schematic of the domain independent layer of the architecture of the system of FIG. 1.

The domain independent agents of the architecture, illustrated in FIG. 2 form the basic tutoring shell of the system. Theses agents are static in that they do not change irrespective of the implementation of the tutoring environment in different domains (subjects or fields). These core sets of agents govern the functioning of the overall architecture, user interactions with the system and the training role-playing and testing that is conducted.

In the multi-computer tutoring system, that is, when multiple computers each are configured as illustrated at 20 in FIG. 1, the domain independent agents of only one of the computers function as the centralized control unit. Thus, the centralized control unit resides on a single machine and coordinates activities across multiple domain agents over a distributed environment of multiple computers.

The functioning of each domain independent agent, in an environment where the tutoring system only features one computer, will now be described.

1) The Control Agent

Figure 3:
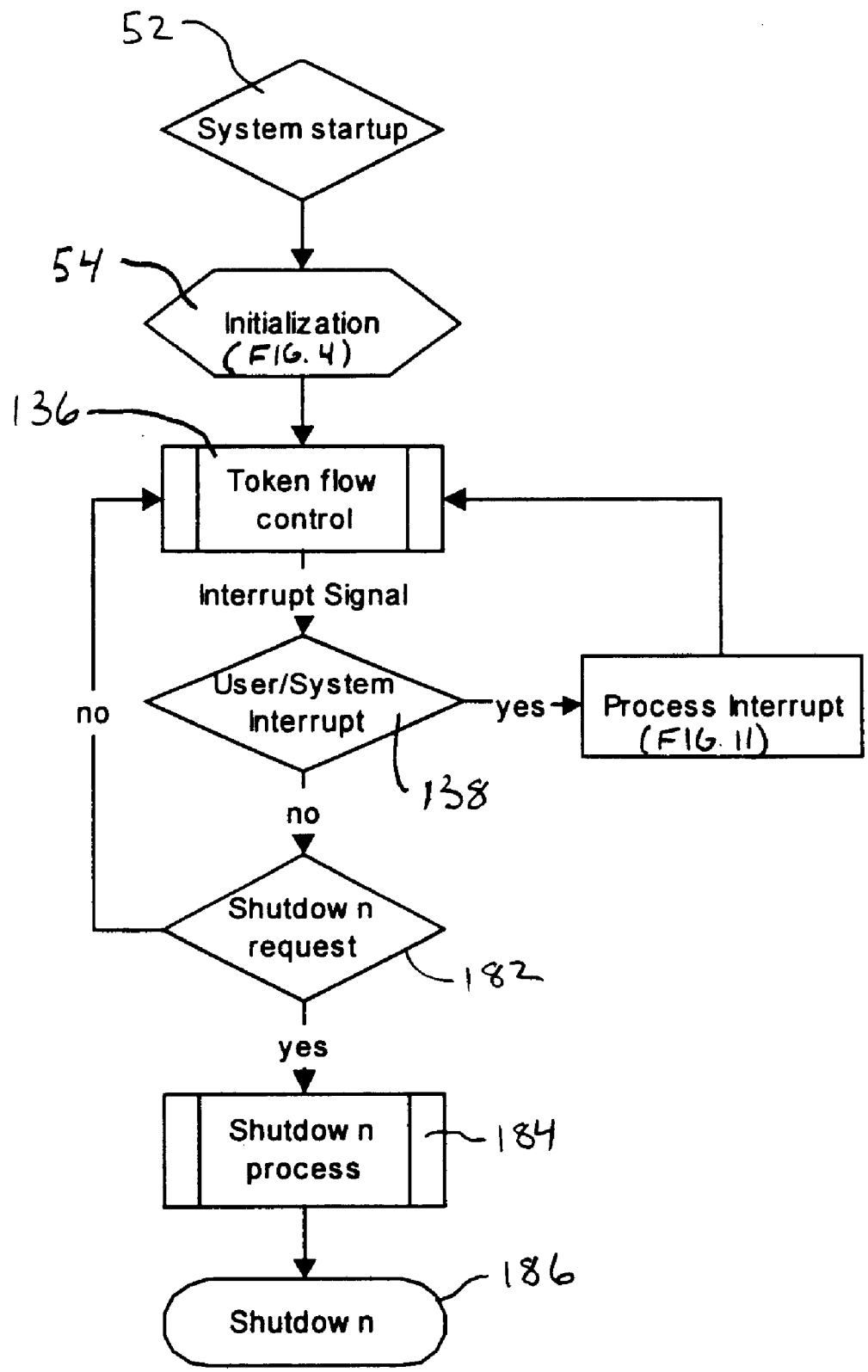
FIG. 3 is a flow chart illustrating the processing performed by the control agent of FIGS. 1 and 2.

The control agent 36 (FIGS. 1 and 2) is the principal agent responsible for the flow of control throughout the overall architecture. The processing of the control agent is illustrated in FIG. 3. As illustrated in FIG. 3, the control agent controls the initialization (startup), running and termination of the tutoring system. It handles all system and user driven interrupts and regulates the amount of central processing allowed to each agent by passing a token from agent to agent. Only when an agent receives this token can it read or write any information external to it. Once this operation is over it will relinquish this token back to the control agent that will pass it along to the next agent.

When the system or the user generates an interrupt, the control agent halts the operations of the entire system, processes the interrupt and then resumes operations. In the case of a system shutdown request, the control agent is responsible for an orderly termination of all the agents and the system.

With reference to FIG. 3, after a user first turns the system on, indicated by the System Startup step illustrated at 52, the control agent performs the Initialization step 54. Proper initialization of the system is required to enable all of the agents, databases and other architecture components of the invention to communicate with one another and thus, for the system to function correctly.

Figure 4:
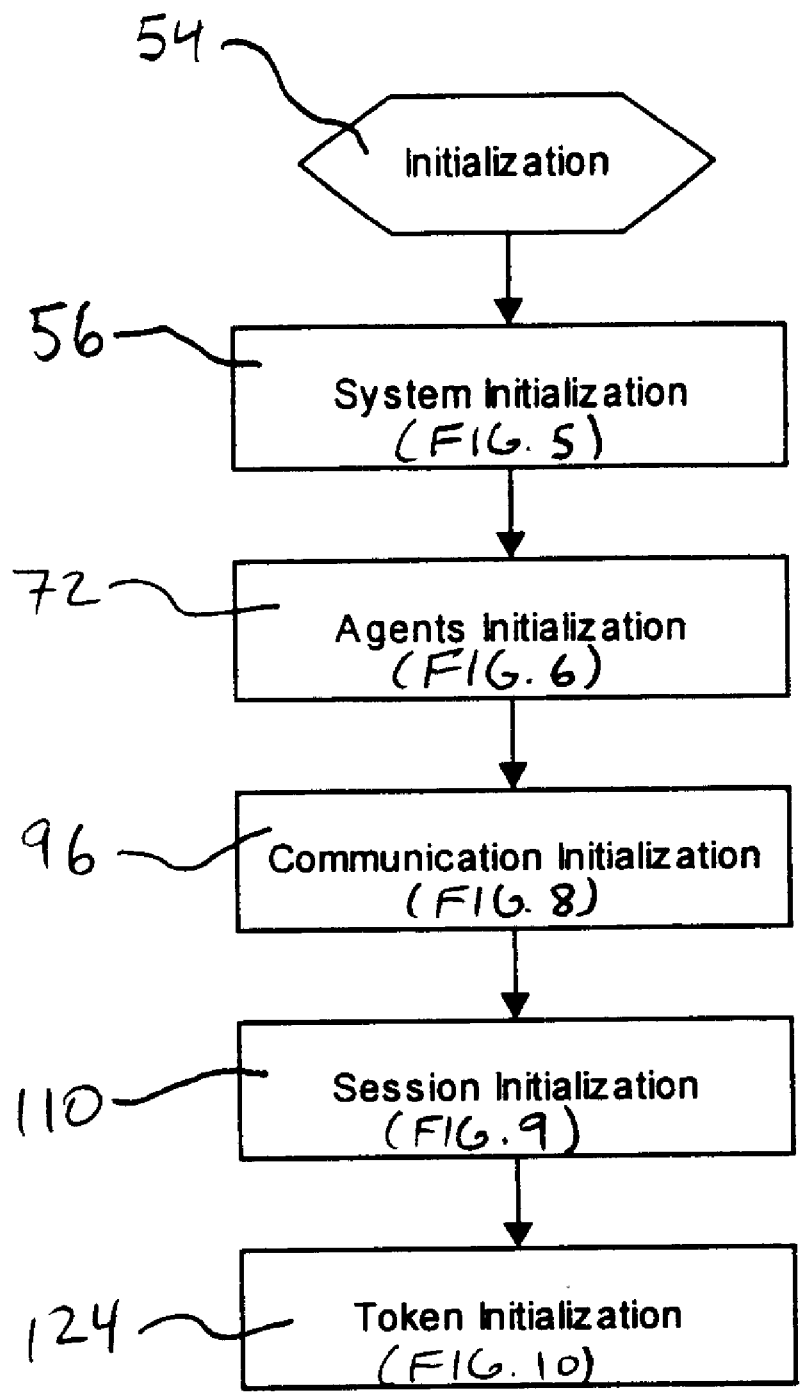
FIG. 4 is a flow chart illustrating the initialization performed by the control agent of FIGS. 1 and 2.
Figure 5:
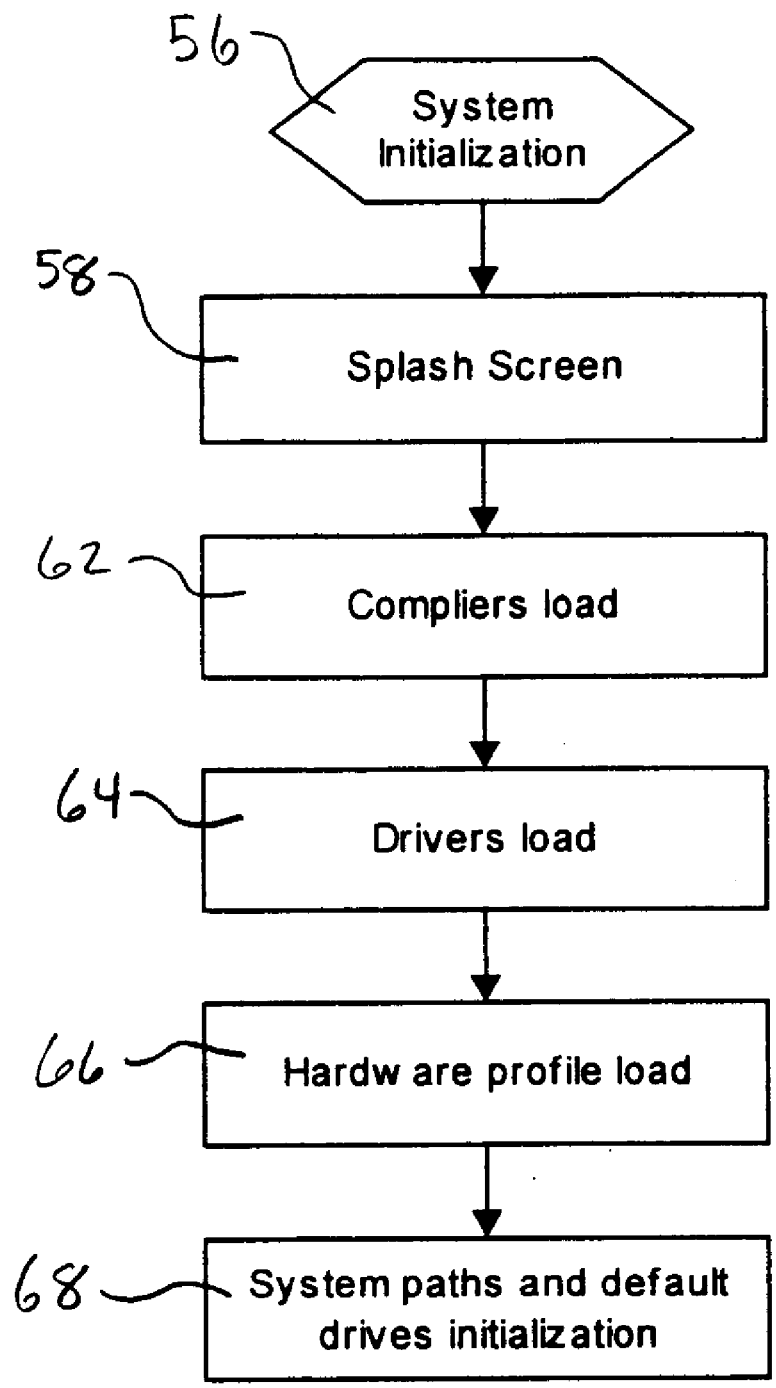
FIG. 5 is a flow chart illustrating the system initialization performed by the control agent of FIGS. 1 and 2.

The Initialization step of FIG. 3 involves the five initialization sub-steps illustrated in FIG. 4. The first sub-step is System Initialization 56. In initializing the system, the control agent performs the processing illustrated in FIG. 5. First, as indicated at 58, an initial "welcome screen" (splash screen) is displayed on the user display 52 of FIG. 1. The control agent directs the UI agent (32 in FIGS. 1 and 2) to display the splash screen while the following activities take place.

First, as indicated at 62 and 64, all necessary compilers and the associated system level drivers are loaded from the system (20 in FIG. 1) hard drive onto the operating system. Next, as indicated at 66, the default drivers, that is, the system hardware drivers (monitor, mouse, keyboard, etc.) will read-in a file that has the hardware profile of the system (20 in FIG. 1) that the tutoring system is installed on. This hardware profile file is created during the initial installation of the tutoring system. The last step 68 in the initialization of the system is the loading of the directory structures for the tutoring system, including the path locations to the general areas of the agents of FIG. 1, the directory structures for the operating system and the initialization of drive letters for the databases and data repositories, including the student database 46 and the training/testing data repository 44 of FIG. 1.

At this point, the control agent has completed the System Initialization sub-step 56 of FIG. 4, and thus, the directory structures (paths), drivers, compilers and system hardware configuration information have been loaded. The control agent next proceeds to the Agents Initialization step 72.

During the Agents Initialization step 72, the control agent loads the remaining agents into the operating system of the tutoring system. As illustrated at 74 in FIG. 6, the control agent reads a domain independent agents profile list, which is a list of the domain independent agents that need to be loaded. As a result, as illustrated at 76, the domain independent agents are loaded into the operating system of the tutoring system.

Figure 7:
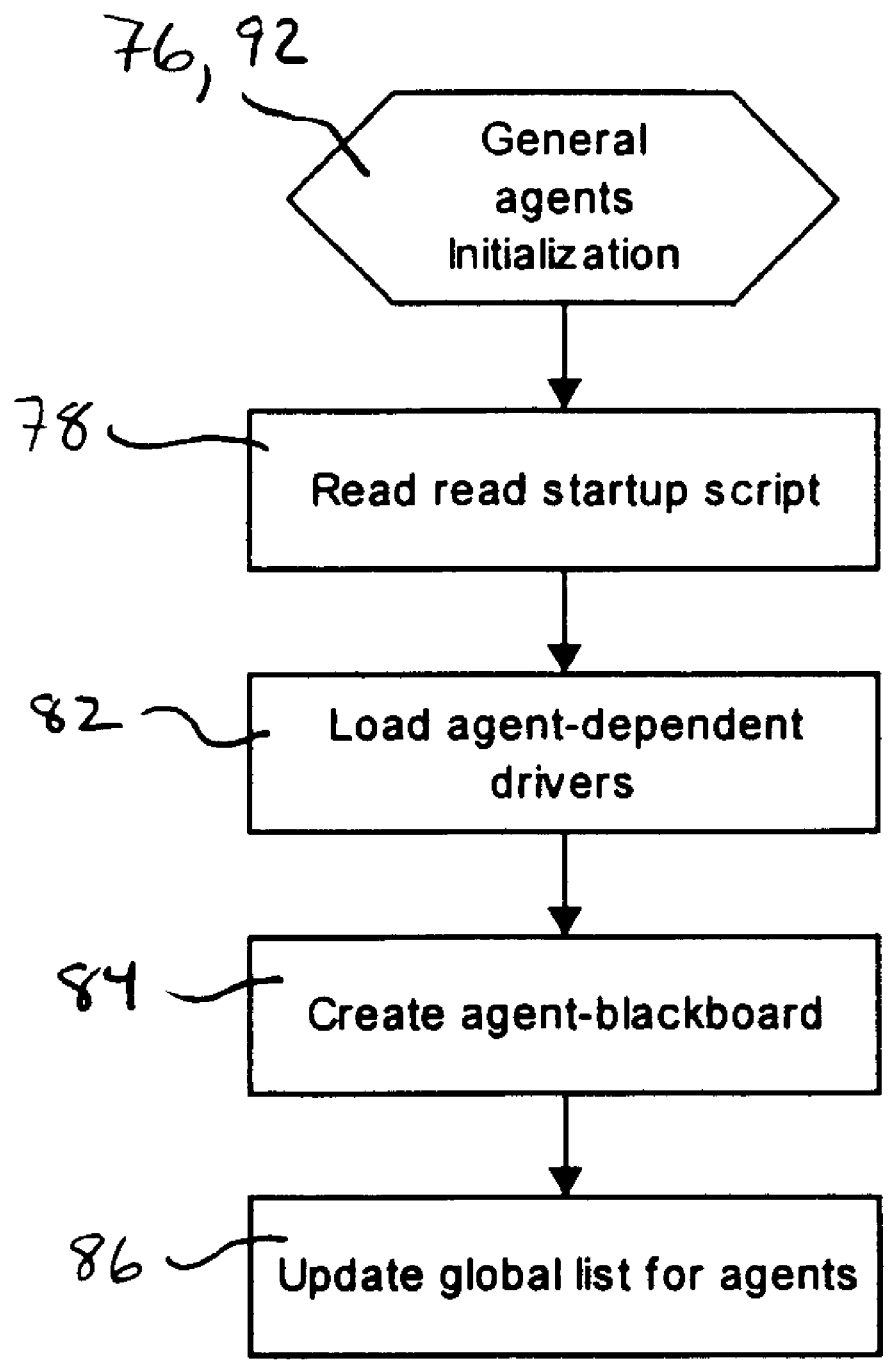
FIG. 7 is a flow chart illustrating the individual agent initialization performed by the agents of FIG. 1.

As illustrated in FIG. 7, as each agent loads, it reads a startup script during step 78 that tells it, for example, to be compiled or to check for certain drivers to be loaded. As indicated at 82 and 84, as each domain independent agent is loaded, the agent-dependent drivers are also loaded and the blackboard (file) for the agent is created. Finally, as indicated at 86, a global list is created for the domain independent agents when the first domain independent agent is loaded. The first domain independent agent is then added to the global list as an entry along with its blackboard's format information. Each following domain independent agent, along with its blackboard format information, is added to the global list as it is loaded.

Figure 6:
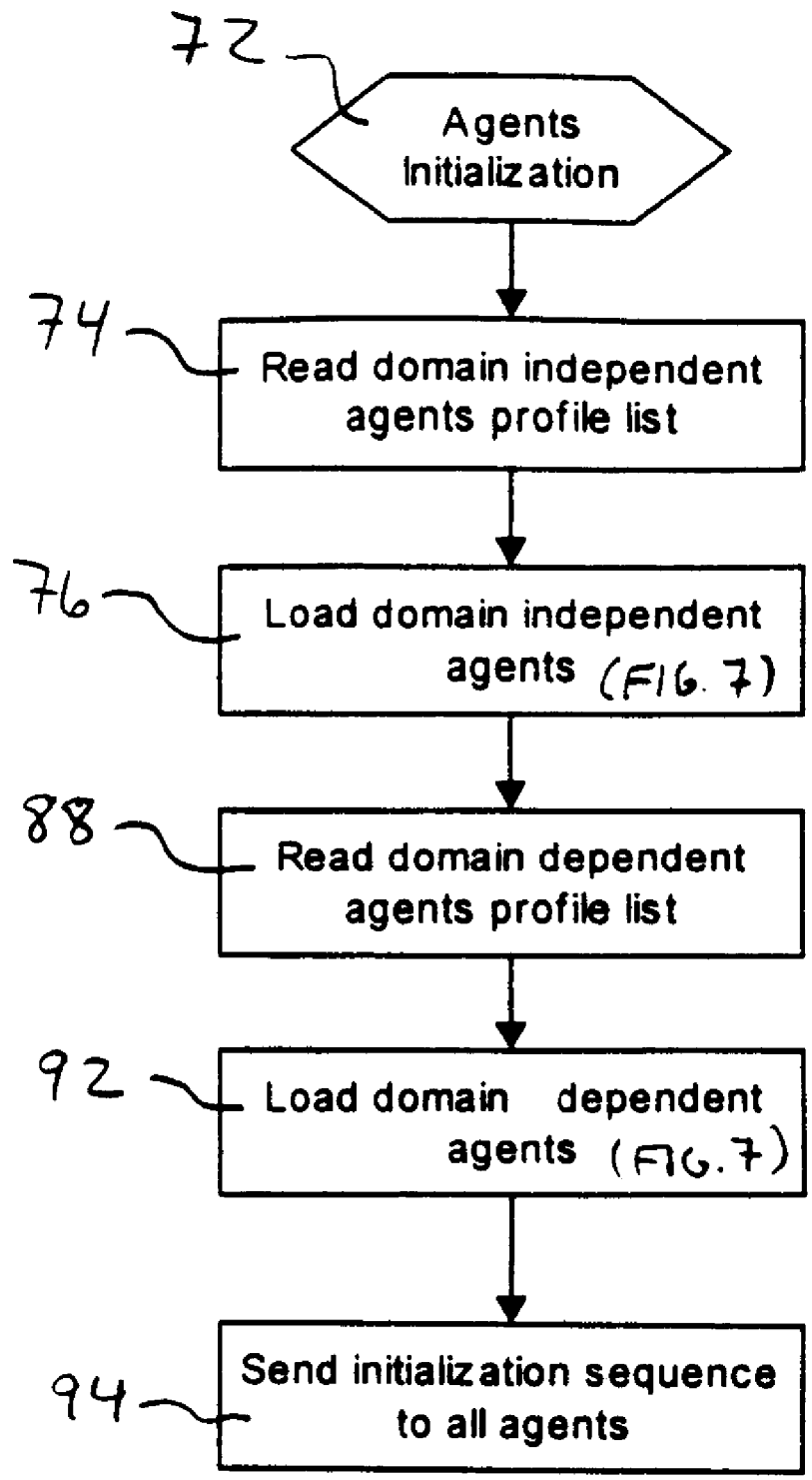
FIG. 6 is a flow chart illustrating the agent initialization performed by the control agent of FIGS. 1 and 2.

As illustrated at 88 and 92 in FIG. 6, the above process is repeated for the domain dependent agents using a domain dependent agents profile list. The steps of FIG. 7 are performed at the domain dependent agents are loaded and a domain dependent agent global list is also created.

All agent startup lists and both the domain independent and domain dependent profile lists are created during installation of the tutoring system.

As illustrated at 94 in FIG. 6, the loading of the domain independent and domain dependent agents is followed by the control agent sending an agent initialization message directly to each agent. This message essentially verifies that each agent is has been loaded and is ready to go.

The control agent may communicate with each of the other agents directly. The control agent is the only agent that has this capability. The other agents must communicate with one another through the blackboards and the blackboard agent, 42 and 38, respectively, in FIGS. 1 and 2. As stated previously with regard to FIG. 1, each agent communicates with its dedicated blackboard through transmission control protocol/internet protocol (TCP/IP) links 43*a*–43*j*. Accordingly, the next Initialization sub-step, illustrated at 96 in FIG. 4, is Communication Initialization to establish the TCP/IP links between the agents and their blackboards.

Figure 8:
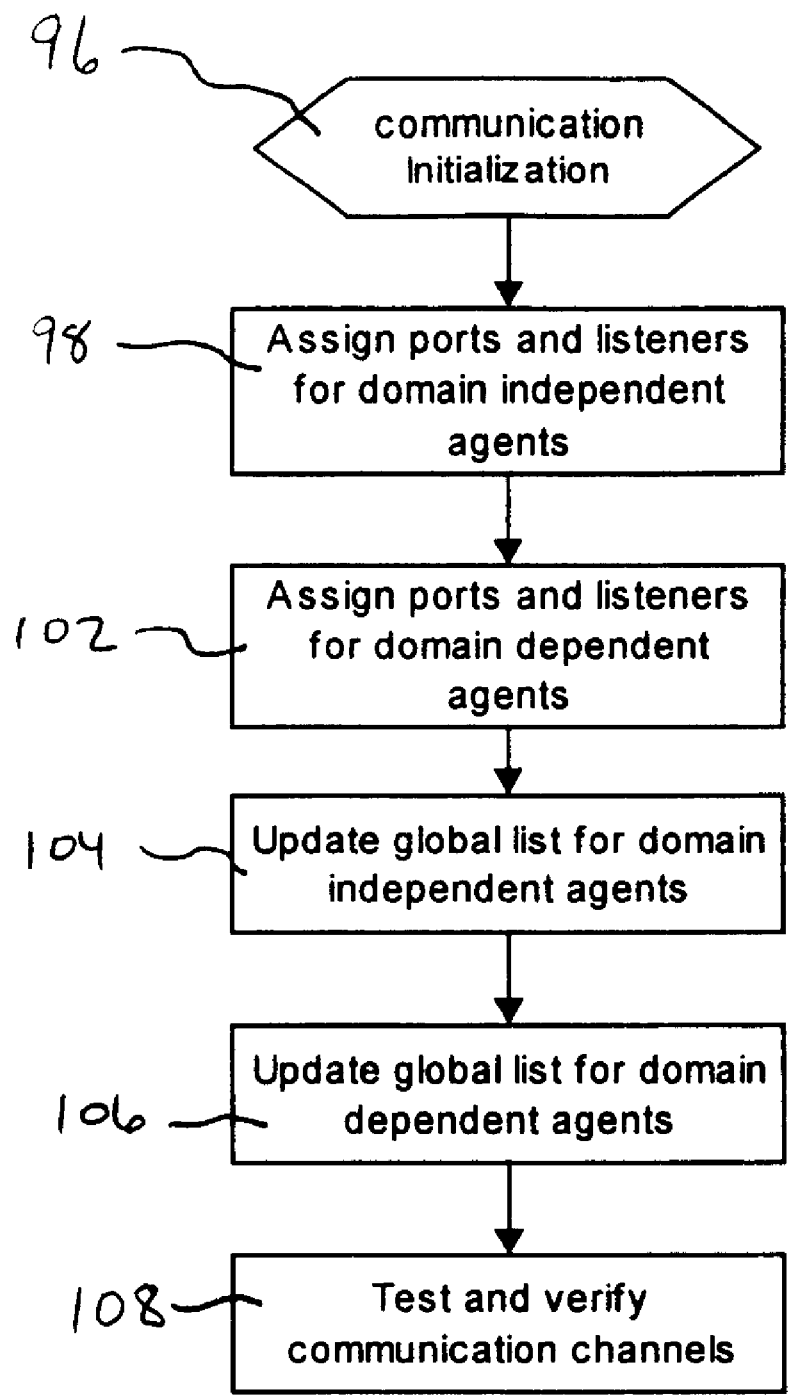
FIG. 8 is a flow chart illustrating the communication initialization performed by the control agent of FIGS. 1 and 2.

The control agent performs communication initialization via the processing of FIG. 8. As indicated at 98 and 102, the control agent establishes unique ports (for TCP/IP communication) and listeners for each blackboard and domain independent and domain dependent agent. The listeners permit the blackboard and agents to recognize which messages or packets of information is being directed to them. These specific ports and the machine name, localhost if the tutoring system features only one computer, are then updated on the global lists for the domain independent and domain dependent agents per steps 104 and 106. As indicated at 108, the control agent then tests the resulting communication channels (TCP/IP links) by sending out test messages that verify that all of the agents are up and can communicate properly.

The loading of the tutoring system is completed at this point. It should be kept in mind that the above steps and sub-steps are performed very rapidly and all while the splash screen (58 in FIG. 5) is displayed on the user display 52 of FIG. 1.

Figure 9:
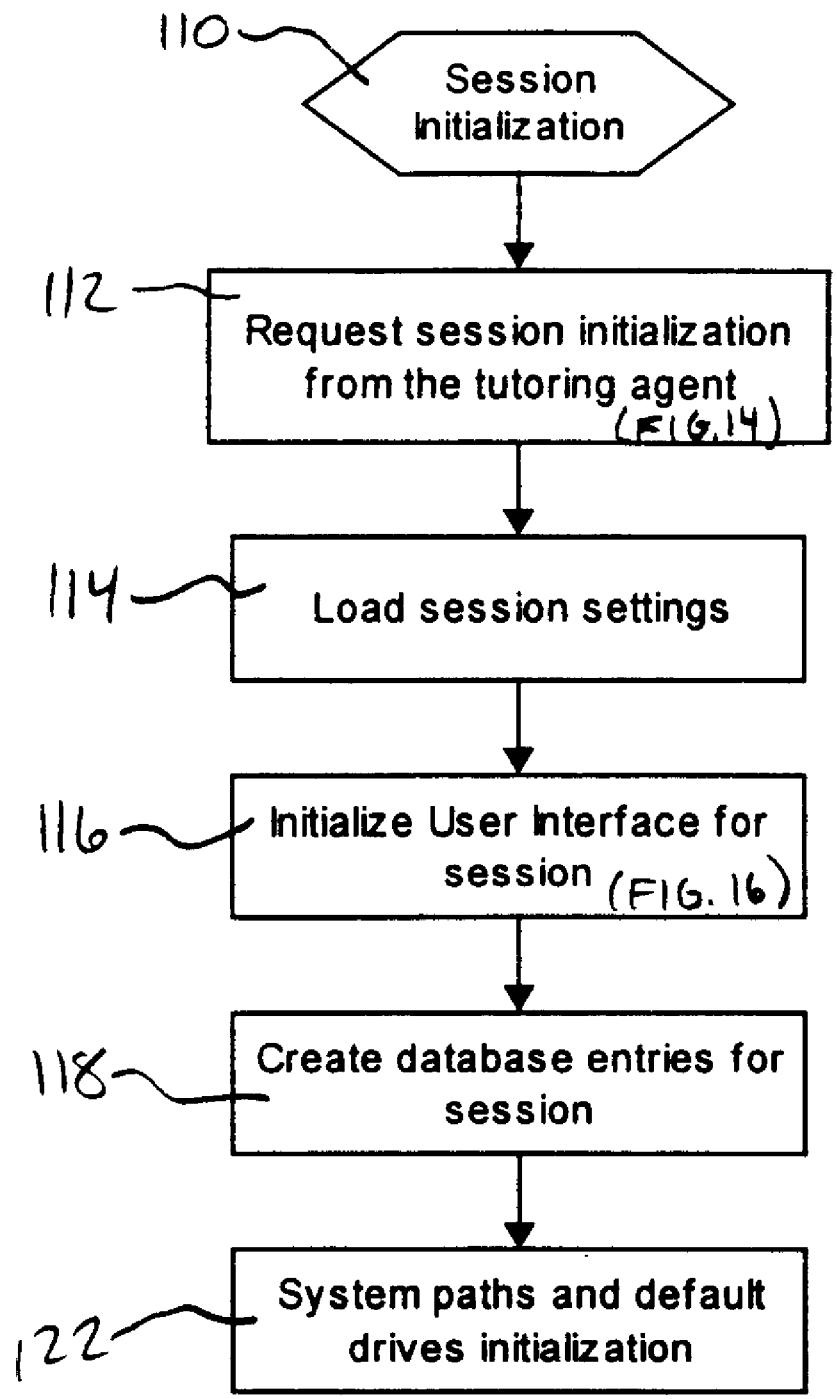
FIG. 9 is a flow chart illustrating the tutoring, role-playing or training session initialization performed by the tutoring agent of FIGS. 1 and 2.

As illustrated at 110 in FIG. 4, the next step in the initialization process is Session Initialization. This step involves interaction between the user and the system 20 of FIG. 1 so that the parameters for the current training/testing session are established. The processing performed by the tutoring agent (40 in FIG. 1) when session initialization is requested by the control agent, step 112 in FIG. 9, is detailed later during the discussion of the tutoring agent with regard to FIG. 14.

During step 112, the user logs onto the system and then chooses whether to resume from where he or she left off during a previous session or start a new session. If the former is selected, the tutoring agent prompts the user with a list of bookmarks representing the various lesson plans or tests that they have partially attempted in the past and may want to continue.

If the user chooses to start a new session, he or she chooses which topics, each of which corresponds to a domain dependent agent, he or she wishes to be tutored/tested on and the level of training. The level of training can be specified either as the level of expertise the user has, the experience the user has with specific areas/topics or some combination of the two. In addition, if beginning a new session, the user selects which mode he wishes the system to operate in. The user may choose between the three following modes:

Training mode: In this mode the user asks the system to evaluate different aspects of a lesson plan and then go through the agents' reasoning process in detail. The user has the ability to stop the system (at any point in time) and ask a variety of questions to clarify what the system is doing like "why" and additional questions like "why-not" and "what-if". At the end of every lesson plan the user is given the option of participating in a series of questions on that particular lesson plan.

Role-playing mode: In this mode the user plays some of the roles of the domain dependent agents while leaving the rest to the tutoring system. This mode allows the user to gain specialization in a particular activity that mirrors the real environment rather than just a topic or lesson plan. This mode can also be activated on a multi-user level where two or more of the tutoring systems can connect and facilitate multiple users to play different roles.

Test mode: In this mode the system basically tests the user on a selected range of topics. In this mode the user chooses a particular area for the test or the system can take the user through a structured set of tests. The tests can also be based upon the weaknesses of the user based on past interactions with the system.

Once the user has made his or her session selections, the session selections are loaded into the memory of the control agent, as indicated at 114 in FIG. 9.

As illustrated at 116, the user interface, consisting of the user display 52 and graphical front-end 48 in FIG. 1, must be initialized so that the appropriate system screens may be displayed to the user. The control agent directs the UI agent, 32 in FIG. 1, to perform the processing illustrated in FIG. 16 to initialize the user interface. The processing of FIG. 16 will be presented in greater detail later during the discussion of the UI agent.

As indicated by step 118, the control agent next creates entries on the student database (46 in FIG. 1) as to the session settings made by the user in step 114. As a result, the system can track which topics the user has been tutored, which tests the user has taken, etc.

The session settings may also necessitate that the control agent add additional pathways to the directory structures created earlier. This is accomplished by the control agent in step 122. For example, paths may need to be added if multiple computers are to be used during multi-user role-playing session. In addition, as indicated at 122, the system default drivers may need to be re-initialized. An example of this would be the requirement of a different compact disc in the system CD ROM drive (the user wishes to learn about liver cancer and the current CD deals with breast cancer).

As illustrated at 124 in FIG. 4, the last sub-step in the initialization process performed by the control agent is Token Initialization. The token is a key that is generated by the control agent and may only be possessed by one agent at a time. The control agent passes the token directly to a receiving agent, that is, the token is not passed to the receiving agent through the receiving agent's blackboard. The agent possessing the token, whether it be a domain dependent agent or a domain independent agent, may interact with the rest of the tutoring system by requesting information from or posting information to the possessing agent's blackboard. An agent cannot pass data to, or receive data from, its own blackboard unless it has the token. This is why the control agent must pass the token directly to the receiving agent as opposed to passing the token to the receiving agent through its blackboard.

Figure 10:
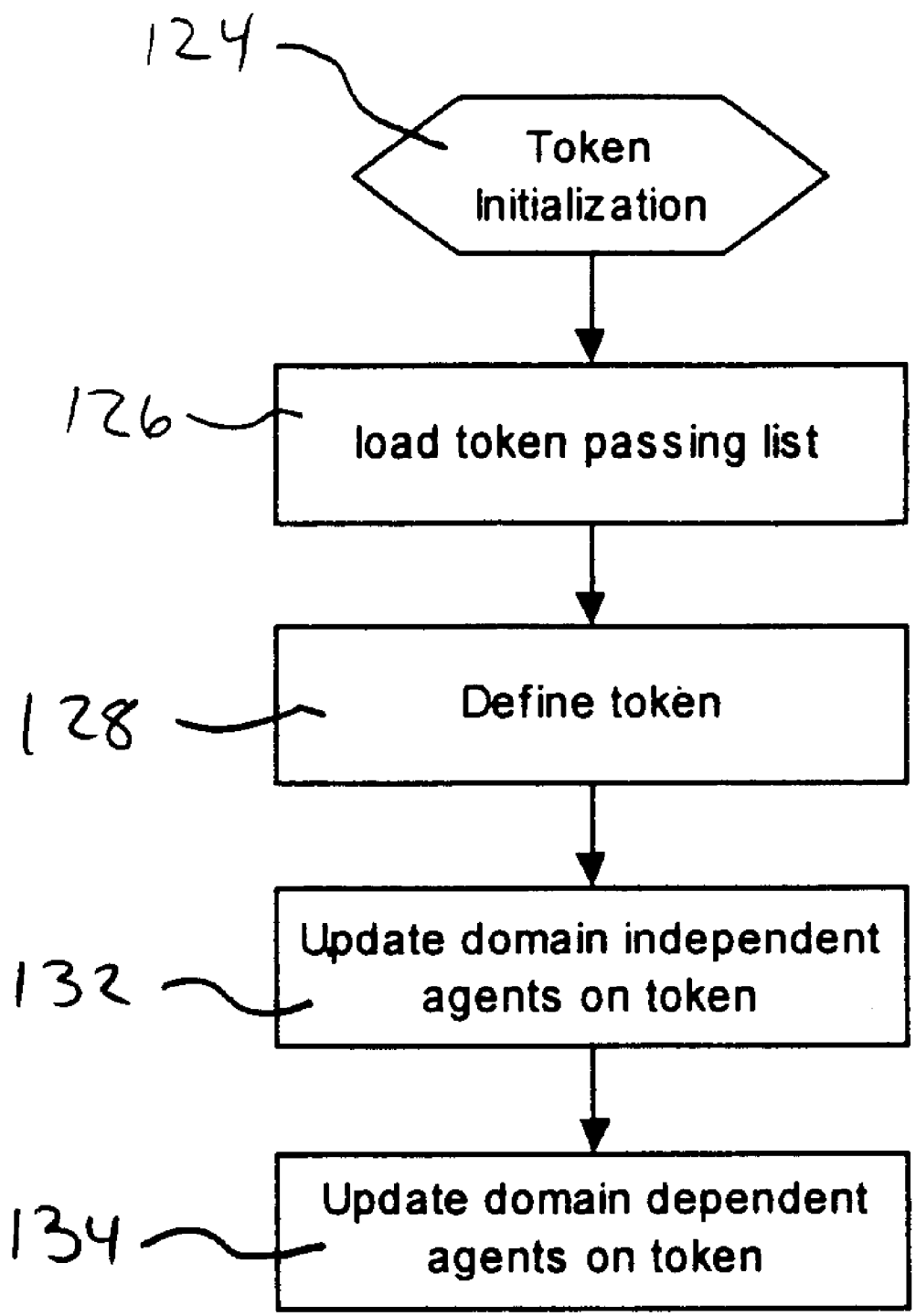
FIG. 10 is a flow chart illustrating the token initialization performed by the control agent of FIGS. 1 and 2.

The token initialization process is illustrated in FIG. 10. As the first step in the token initialization process, indicated at 126, the token passing list is read by the control agent into its memory. The token passing list lists the agents of the tutoring system (both the domain independent and domain dependent) in the order that the control agent will pass the token to them. Given that some agents, typically the domain independent agents, will require the token more often than other agents, the token passing list will include many redundant listing of agents. For example, the token passing list may list a first domain dependent agent, the blackboard agent, a second domain dependent agent, and then the blackboard agent again.

Next, as illustrated at 128, the token is defined. The token is actually a value that is randomly generated by the control agent. A different token value is generated for each tutoring session.

Once the token is generated, as indicated at 132 and 134 in FIG. 10, the control agent accesses the global lists for the domain dependent and independent agents and communicates the value for the token to each list. As a result, both the domain dependent and domain independent agents are informed of the value of the token and thus recognize that they possess the token when it is passed to them in accordance with the token passing list.

This concludes the Initialization step 54 of FIGS. 3 and 4. The user may now interact with the tutoring system to receive tutoring or testing in accordance with the session settings selected earlier. As the user interacts with the tutoring system, the control agent performs the task of Token Flow Control, indicated at 136 in FIG. 3.

During Token Flow Control, the control agent passes and retracts the token between the agents directly (not through their blackboards) in accordance with the token passing list as the session progresses. The only interruption to this process is when there is a system generated or a user generated interrupt, indicated at 138 in FIG. 3.

An interrupt is generated under only two unique sets of circumstances; either it is initiated by the user or an error is generated by the system. In either case, the control agent handles the interrupt by performing the processing illustrated in FIG. 11. When an interrupt (either user initiated or system generated) is encountered, as indicated at 142, the control agent broadcasts to all the agents to cease operations until further notice. This broadcast is made from the control agent directly to all of the other agents, that is, as with token passing, the interrupt message does not go through the agents' blackboards. The control agent broadcasts interrupts directly to the agents because if it instead merely placed interrupt messages on the agent blackboards, the agents would have to wait until they received the token to be notified that an interrupt has occurred.

Figure 11:
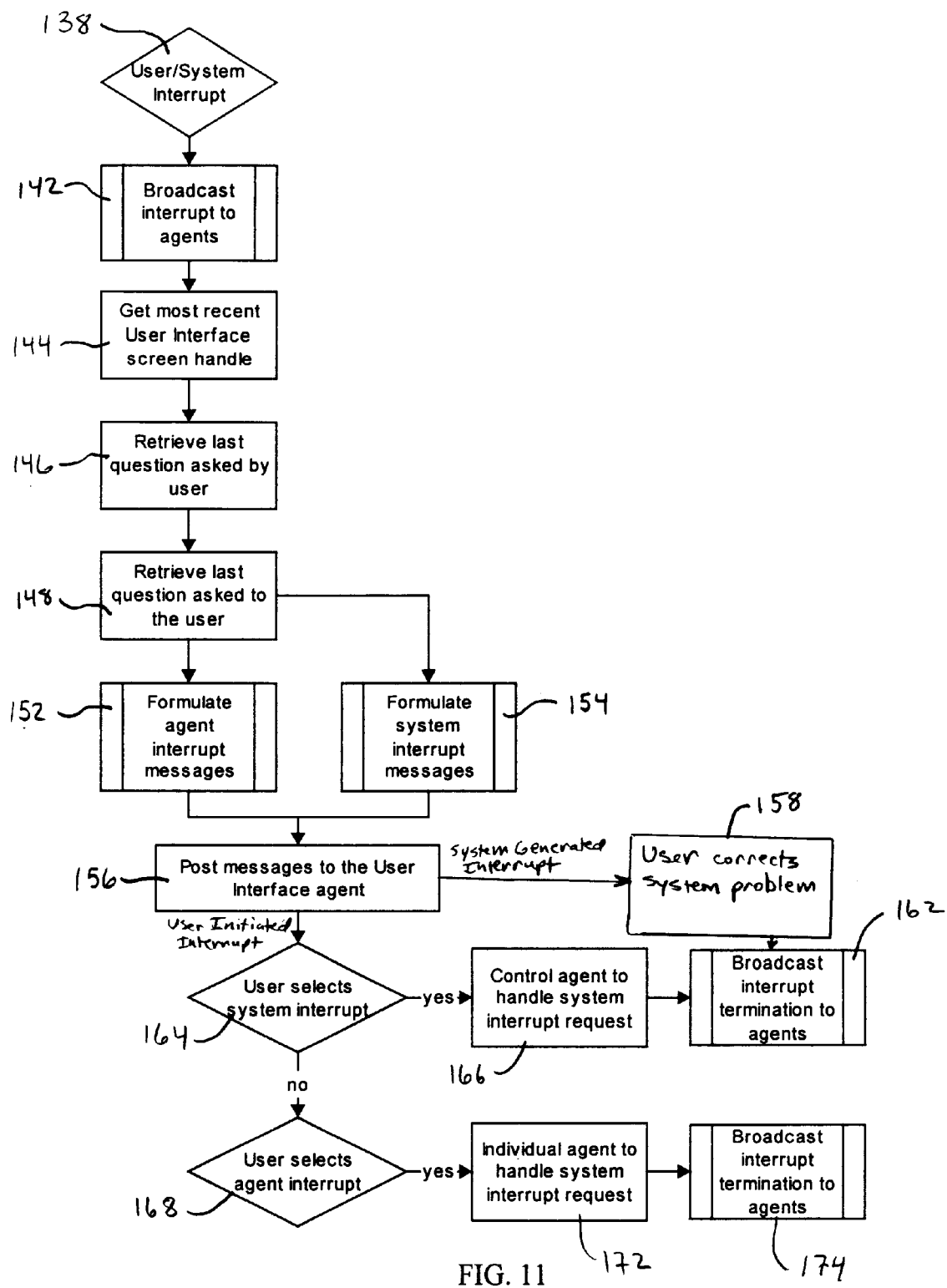
FIG. 11 is a flow chart illustrating the interrupt handling performed by the control agent of FIGS. 1 and 2.

Once the agents have ceased operations, the control agent, as illustrated at 144, 146 and 148 in FIG. 11, gathers information including the most recent UI screen handle, the last question asked by the user and the last question asked to the user by the system. The most recent UI screen handle is a list that includes the screen that the user was on when the interrupt occurred, which window was active, where the user had his or her mouse (x and y coordinates of screen), etc.

As indicated at 152 and 154, the control agent then formulates interrupt messages which may include a list of initial questions to ask the user. The information gathered during steps 144, 146 and 148 permit the control agent to ask the user intelligent questions that are helpful in resolving the interrupt. The interrupt messages may be agent specific (152) or system based (154). System based message would include typical error messages such as notifying the user that the keyboard or mouse is disconnected or a certain CD needs to be placed in the CD ROM drive. Agent specific messages typically result from user initiated interrupts that pertain to a question that a user has with regard to a topic of a domain dependent agent. Agent specific messages may also occur due to the domain dependent agent generating an interrupt in response to a user action. As indicated at 156, the interrupt messages are posted to the UI agent which posts them to the user display 52 via the graphical front-end 48 of FIG. 1.

If the interrupt is system generated (a data file could not be found, etc.) the system interrupt will prompt the user to correct the path, put in a different CD or medium where the data is stored etc. If the user corrects the problem, as indicated by 158, the control agent broadcasts an interrupt termination message, as indicated at 162, signaling the agents that they may resume their individual processing. Like the original interrupt message, the interrupt termination message is broadcast directly to the agents (not through the agent blackboards).

If the interrupt is user generated and, as indicated at 164, the requested action is system dependent, such as a user request for general system help, re-configuration of system features (mouse, monitor resolution, etc.), the control agent, as indicated at 166, will update the hardware profile data or other system related data based upon the user response. The control agent will then broadcast (directly), per 162, an interrupt termination message signaling that the agents can resume their individual processing.

With reference to 168, if the user initiated interrupt is based on a question that the user wants to ask a domain dependent agent, or the interrupt is generated by a domain dependent agent in response to a user action, then, as indicated at 172, the control agent selects the appropriate domain dependent agent to handle the user response to the agent specific messages 152. The information gathered in steps 142, 144 and 146 enables the correct domain dependent agent to be selected by the control agent. During step 172, replies are generated in response to the questions asked by the user by the domain dependent agent with the control agent overseeing the process. This user may ask multiple questions until the user wishes to resume the original session. Then the control agent broadcast (directly) an interrupt termination message at 174 signaling the agents to resume their individual processing.

With reference to 182 in FIG. 3, if the interrupt (whether it be user initiated or system generated) is a system shutdown (or termination) request, the control agent, during step 184, broadcasts the shutdown request (directly) to all the agents, cache'ing only the pending messages for the tutoring agent allowing it to finish processing all its information. The control agent displays a termination screen to the user and terminates itself at 186.

2) The Blackboard Agent

Every agent is associated with an individual, dedicated blackboard (42 in FIG. 1) which is a reserved area in the system memory for information messages pertaining to that particular agent. All messages follow a pre-defined format and are posted to the blackboards with a chronological and priority based ordering.

All agents post messages to and read messages from their dedicated blackboards without the assistance of the blackboard agent when they have the token. All communications (messages) to or from an agent from other agents are moved to and from that agent's dedicated blackboard by the blackboard agent (38 in FIGS. 1 and 2). In other words, the blackboard agent places messages on an agent's blackboard so that the agent may review the message (when it has the token) and an agent posts a message on its blackboard (when it has the token) so that it may be picked up by the blackboard agent. As such, the blackboard agent is responsible for synchronous message transfer to and from the agent blackboards, and thus, to and from the agents. Each agent, without the assistance of the blackboard agent, reads a message from, or writes a message to, its blackboard only when it has the token.

A flag is posted with each message that is posted to an agent's blackboard. There are two types of flags: a blackboard agent flag and a general flag. The blackboard agent flag is set when an agent posts a message and requires the blackboard agent to move it to the blackboard of another agent. The general flag indicates that the message itself requires some action to be taken by the agent whose blackboard it is posted to. When an agent receives the token, it reads any messages on its blackboard that have the general flag set.

Figure 12:
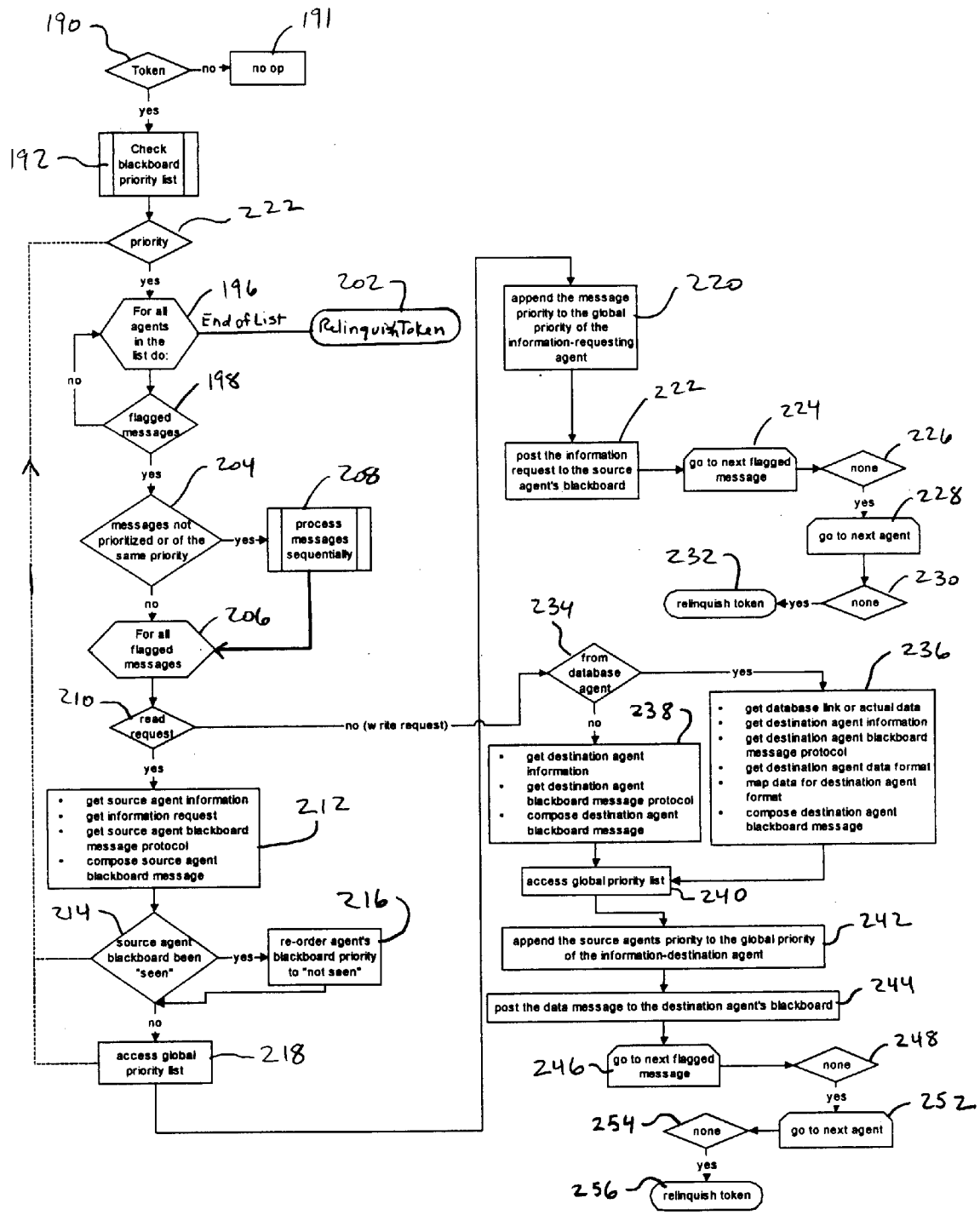
FIG. 12 is a flow chart illustrating the processing performed by the blackboard agent of FIGS. 1 and 2.

The processing performed by the blackboard agent is illustrated in FIG. 12. First, the blackboard agent checks to see if it has the token at 190. If the blackboard agent does not have the token, it knows not to perform any operations ("no op") as indicated at 191. As illustrated at 192, when the blackboard agent gets the token from the control agent, it accesses a priority list containing the order with which it should service agents. For each agent in the list, in steps 196 and 198, the blackboard agent checks to see if there is a message on the agent's blackboard that has the blackboard agent flag set. If there are no agents having blackboard agent flags set on their blackboards, the blackboard agent relinquishes the token, as indicated at 202.

If there are any messages in an agent's blackboard that are have the blackboard agent flag set, the blackboard agent retrieves each according to priority per 204 and performs the following actions per 206. If the messages having the blackboard flags are not prioritized Or all have the same priority, the messages are handled/processed by the blackboard agent sequentially, as indicated at 208.

The processing that is performed by the blackboard agent after step 206 depends upon whether the flagged (blackboard agent flag) message is a "read" request or a "write" request. An agent posts a "read" request message if it seeks information from another agent or a database. If the message is a read request 210, the blackboard agent, at 212, retrieves the source agent information, the information requested and the source agent (information source) blackboard protocol from the message. The blackboard agent then composes and formats a message that, as described below, will be placed on the source agent's blackboard.

As indicated at 214, if the source agent has already been serviced or "seen" by the blackboard agent as part of this token cycle, that is, during the current period of possession of the token by the blackboard agent, then, as indicated at 216, 218 and 222 the blackboard agent will re-order its priority list to service or "see" the source agent again while it still has the token.

The message that was formatted for the source agent in step 212 is prioritized in step 220. The priority of the message is a combination of the priority for the agent requesting the information (the agent that posted the read request) and the priority of the information requested. The priority of the agent is found in the global priority list which is are columns on the domain dependent and domain independent agent global lists. The message is then posted to the source agent's blackboard in step 222. Processing for the next message on the requesting agent's blackboard that is flagged with a blackboard agent flag continues as indicated by steps 224, 226 and 228. If there are no more such flagged messages, the blackboard agent relinquishes the token per steps 230 and 232.

An agent posts a "write" request message to its blackboard when it wants to send information to another agent or database. As illustrated at 234, write requests may be posted to the database agent blackboard by the database agent (236) or to any of the other agent blackboards by their corresponding agent (238).

When the database agent posts a write request respect, as illustrated at 236, the blackboard agent gets the database link or actual data to be posted (links are handles to graphic or multi-media files, etc.). Next the blackboard gets the destination agent information and its blackboard message protocol. The blackboard agent also retrieves the destination agent's data format (format that it will accept data if the message contains data instead of a link to it). The blackboard agent then formulates the new message from the database agent for posting to the blackboard of the destination agent.

If the write request is from an agent other than the database agent, then, as illustrated at 238, the blackboard agent reformulates the write request according to the destination agent's blackboard protocol.

As illustrated at 240, 242 and 244, once the message is correctly formulated, it is posted on the destination agent's blackboard with a priority that is derived from the message source agent and the message priority.

As illustrated at 246, the blackboard agent then goes on to the next message flagged with a blackboard agent flag for that agent. As illustrated at 248 and 252, after a particular agent's messages have been sorted, the blackboard agent then picks-up the next agent on the priority list and repeats the above process. As illustrated at 254 and 256, when the blackboard agent has processed all of the agents in it's priority list, it relinquishes the token back to the control agent.

3) The Database Agent

The database agent, 34 in FIGS. 1 and 2, is responsible for information communication to and from the databases. This agent serves as the main interface between the database blackboard (which is the database agent blackboard) and the individual databases. The database agent handles all requests posted to the database blackboard in order of priority. The two main system databases are the training/testing data repository and the student database, illustrated at 44 and 46, respectively, in FIG. 1. The former stores static data that pertains to the training, testing and the role-playing environment and which typically includes domain (field or subject matter) specific information pertinent to the multi-media and exemplar information that is used for tutoring, role-playing and testing. There will also be all the procedural information (on the cooperative nature of the domain dependent agents) that is applicable to the training and testing domain. The student database stores student information (or profile) data.

Figure 13:
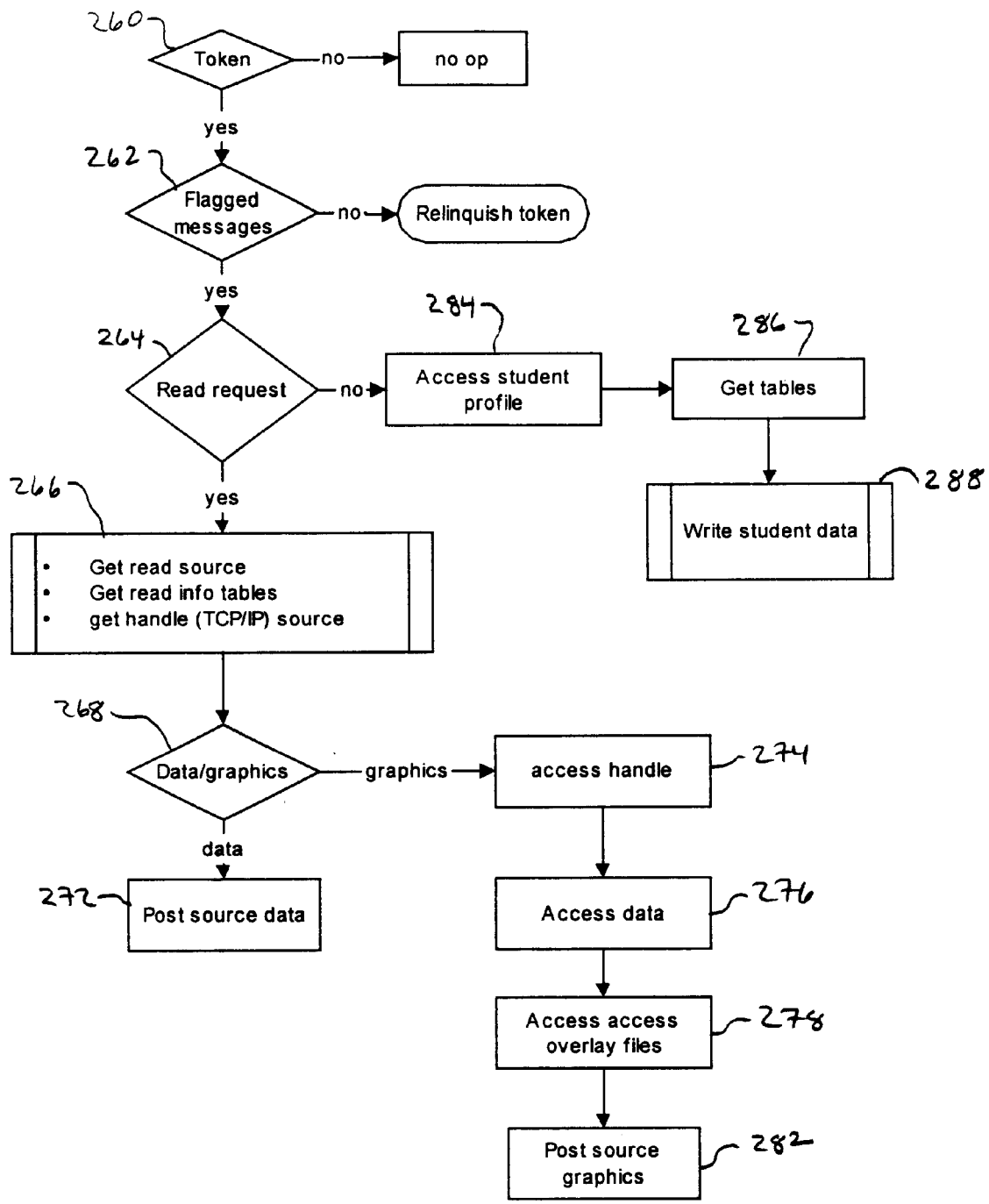
FIG. 13 is a flow chart illustrating the processing performed by the database agent of FIGS. 1 and 2.

The processing performed by the database agent is illustrated in FIG. 13. After the database agent checks for the token and flagged messages in steps 260 and 262, as is done by all agents, the two basic types of requests that the database agent may handle, as indicated at 264, are read requests, which are from other agents requesting information from the training/testing data repository (44 in FIG. 1) for training, role-playing or testing and write requests from other agents to the student database (46 in FIG. 1).

In the case of read requests for information from the data repository, as indicated at 266, the database agent will determine the requesting or source agent (the agent requesting the information) from the message posted to the database agent blackboard. In addition, the database agent will read in the info tables which is a script file that lists all of the different data types and how they should be handled. The database agent also accesses the agent global lists and uses the name of the requesting/source agent to obtain its handle to determine if it is local or remote, the latter of which will be discussed below in the section on multiple computers.

Next, as indicated at 268, the database agent will determine if the data is requested in textual or graphical form. If the latter, as indicated at 272, the requested data will be posted on the database agent blackboard (with the blackboard agent flag set). Request for information in graphical and other multimedia formats, as illustrated at 274, 276, 278 and 282, will result in a response message from the database agent featuring a handle to the path of the information requested. If the read request results in multiple handles, the database agent will return a message containing a primary data path along with overlay information (278) specific to that request.

If a write request is posted to the database agent blackboard, the database agent will access the student profile in the student database, as indicated at 284, using the student login information. A session table is created on the student database for each tutoring session for the student. As illustrated at 286, the database agent accesses the session table and then writes the information/data thereto as indicated at 288.

4) The Tutoring Agent

The tutoring agent, 40 in FIGS. 1 and 2, is responsible for coordinating the efforts of students in their use of the tutoring system in learning, role-playing and testing while also tracking their progress. The agent also records all of a student's actions during tutoring or testing sessions in the student database with respect to specific lesson plans that are reviewed. The student database entries for a user/student may be used as positive or negative reinforcement during user evaluation through tests. For example, the tests that a student takes may include questions that emphasize topics with which the student experienced difficulties during prior tutoring sessions and testing.

Figure 14:
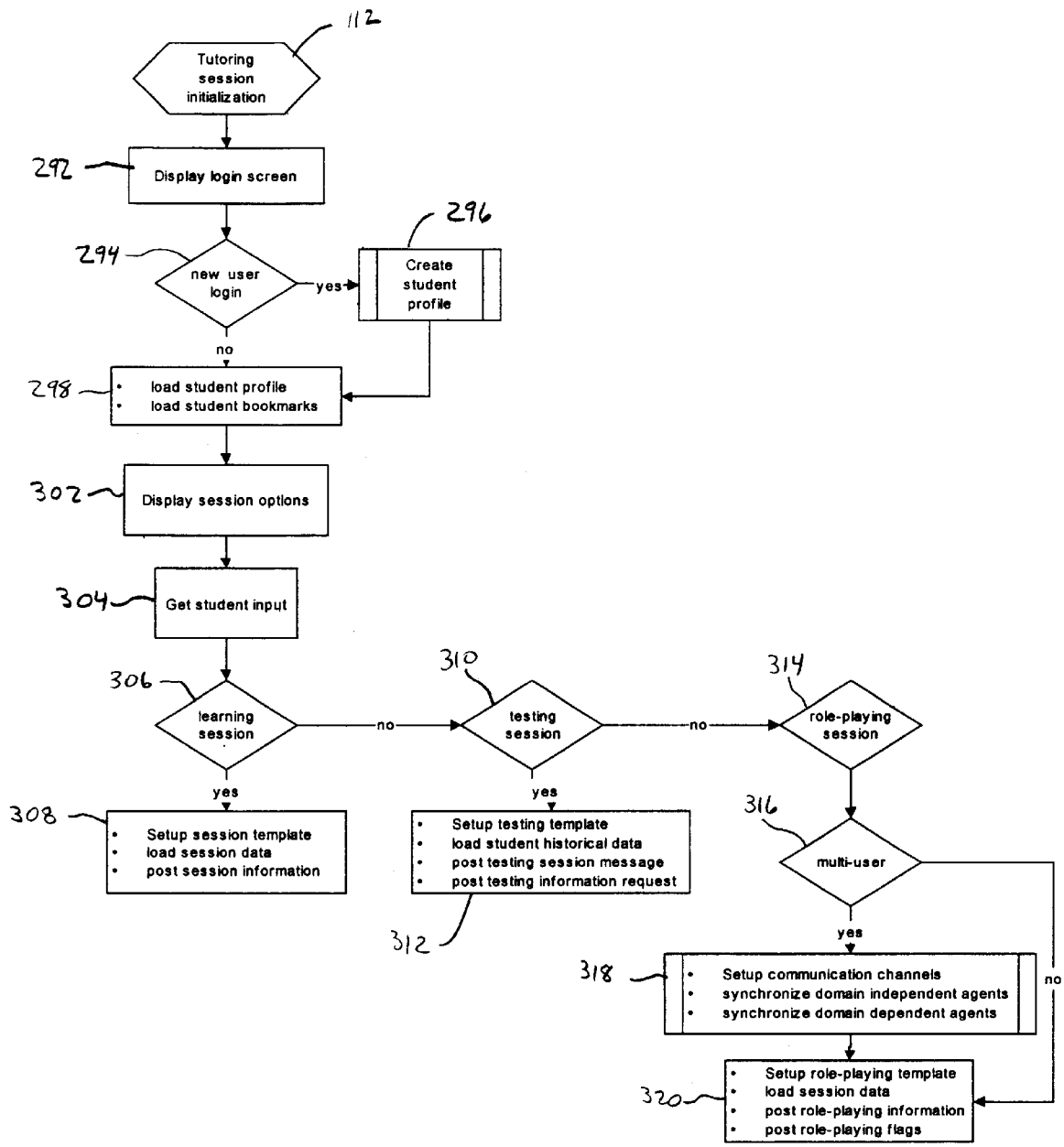
FIG. 14 is a flow chart illustrating the processing performed by the tutoring agent of FIGS. 1 and 2.

In addition to the general initialization process that all agents follow, which was described with reference to FIG. 7, the tutoring agent is tasked with the additional responsibility of initializing the tutoring, role-playing or testing session at the startup of the software. When the control agent sends the session initialization request, step 112 in FIG. 9, the tutoring agent performs the following series of actions, which are illustrated in FIG. 14.

First the tutoring agent requests (directly) the user-interface agent to display the login screen 292 which is the first screen where the user interacts with the system. As illustrated at 294, the user can either login with an existing login ID and password or create a new profile 296. As illustrated at 298, the creation of a new profile triggers a standard template call that will create a blank student profile with that ID and login in the student database and a blank set of bookmarks indicating that the student has never used the system before.

If the login is already on record then the tutoring agent will retrieve the profile and bookmarks for that student. Based on this information the tutoring agent will then formulate a set of possible tasks or session options that the user might want to do for this session. The session options are displayed to the user at 302. The student then selects the session option at 304.

If the student selects a learning session 306, then, as indicated at 308, the tutoring agent will load the session template, which is stored in the training/testing data repository, into the computer operating system. The template, which is essentially a stencil, is filled in with the session data from the training/testing data repository depending upon the selections made by the user/student. If the student wishes to continue from where he or she left off during the last session, or wishes to re-do the lesson plan, the system will load the last known template for that particular lesson plan along with the bookmarks and appropriate session data. The tutoring agent then will post the session information to the control agent and to the blackboards of the remaining system agents.

If the user selects testing 310 as the activity, the tutoring agent, as illustrated at 312, will setup a generalized template for testing. The tutoring agent will also retrieve all of the historical data stored on that student from the student database with respect to the particular area that the student is going to be tested on. The tutoring agent will then post two messages to the blackboards of the other agents. One to indicate to all agents that this is going to be a testing session and the second one to all agents to request testing information.

If the student requests a role-playing session 314, the tutoring agent will first determine if the session is going to be single-player or multi-player, as indicated at 316. If a multi-player request is made, as illustrated at 318, the tutoring agent will query the user as to the addresses of the additional machines involved and the roles of the different users or students. The tutoring agent will then establish a communication channel (TCP/IP) with the additional machines and send out a message to the control agents of all of the machines involved requesting synchronization of their domain independent and domain dependent agents with the domain independent and domain dependent agents of the requesting or primary machine or computer. From then on, all the tutoring environments on all the connected machines will mirror the activities on the requesting/primary machine. Additional information regarding the multi-machine configuration will be presented below.

As illustrated at 320, the tutoring agent will then load the role-playing template and the session data. The tutoring agent will then post the role-playing information to the control agent and post role-playing flags on the selected domain dependent agents to reflect the selected subject matter or topics.

At the conclusion of the processing of 308, 312 or 320, the tutoring agent will relinquish control to the control agent.

Figure 15:
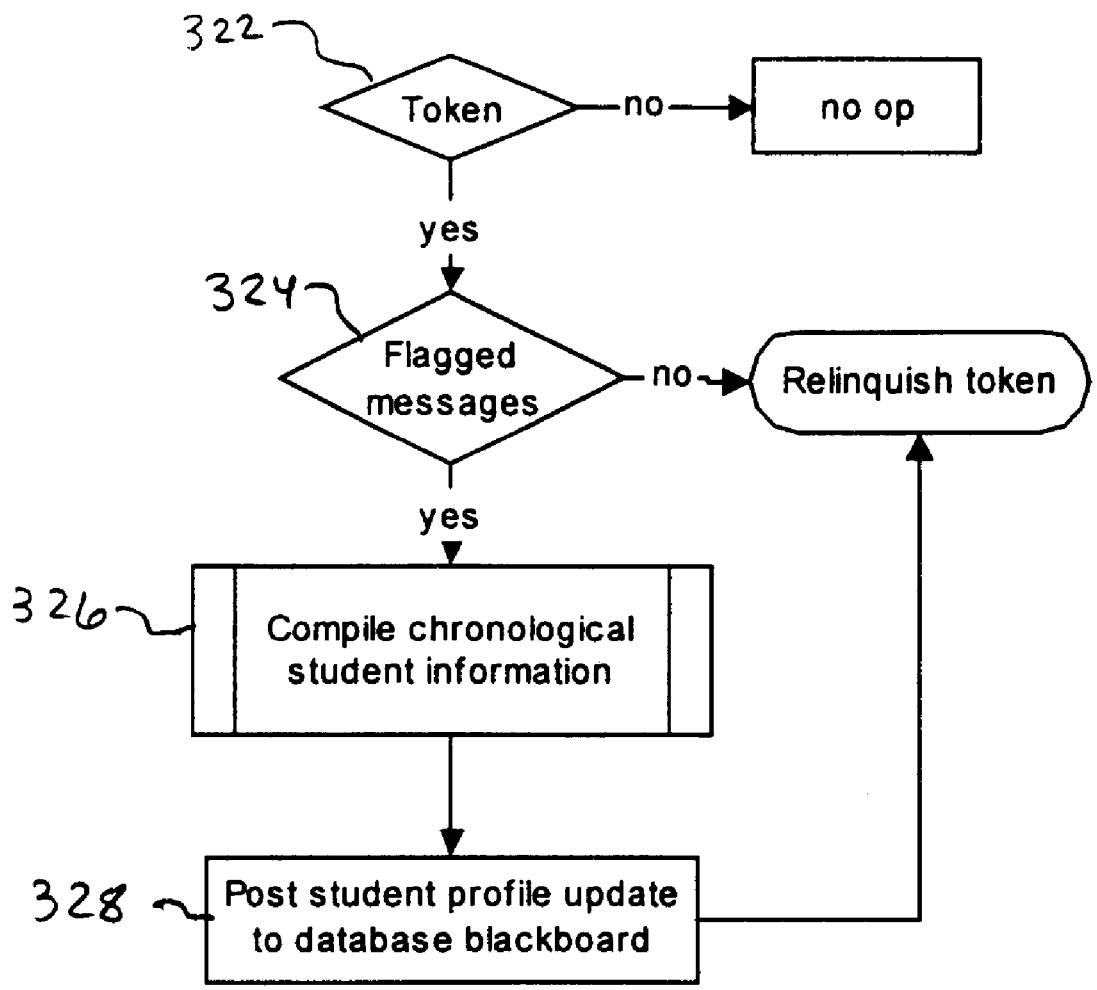
FIG. 15 is a flow chart illustrating the information compilation performed by the tutoring agent of FIGS. 1 and 2.

During normal system operation, when the token is passed from the control agent to the tutoring agent, the tutoring agent will perform a routine book-keeping operation illustrated in FIG. 15. After the tutoring agent checks that it has the token at 322 and checks for flagged messages at 324, it will gather and compile all the student log information since the last time it received the token and then store it in the student's profile in the student database (steps 326 and 328). This book-keeping will comprise of both domain independent and domain dependent learning of the student's profile.

The domain independent information will consist of mouse events, questions asked, repeated questions and template based information on the lesson plan. The template based information will contain tags to important questions that, if asked will generate an event to be recorded in the student's profile.

Domain dependent information will consist of scripts for that particular lesson plan (i.e. what are the key concepts, the teaching points, etc). as well as lesson specific guidelines such as the number of times the student covered the topic, the number of times exercises were requested on a particular topic and the number of times questions were selected from a particular topic for testing.

This student profile information is recorded into a set of tables in the student database that contain information about lesson plans, user generated interrupts, questions the user asks, questions posed to the user, user answers to the questions, the validity of the answers, mouse events, graphical events that the user commits, etc. All events will have a time stamp representing a chronological ordering and the amount of time spent. It should be noted that even with termination, this process will be completed before system shutdown (step 184, FIG. 3).

5) The User Interface Agent

This agent controls all the information displayed to the user. It is responsible for configuring the graphical front-end, 48 in FIGS. 1 and 2, to display the relevant information in the format best visualized by the user. This agent is also responsible for capturing all user inputs (including interrupts). The user interface (UI) agent communicates with the graphical front-end using a API which allows the front-end to be written in any language and still be independent of the agent controlling it.

Figure 16:
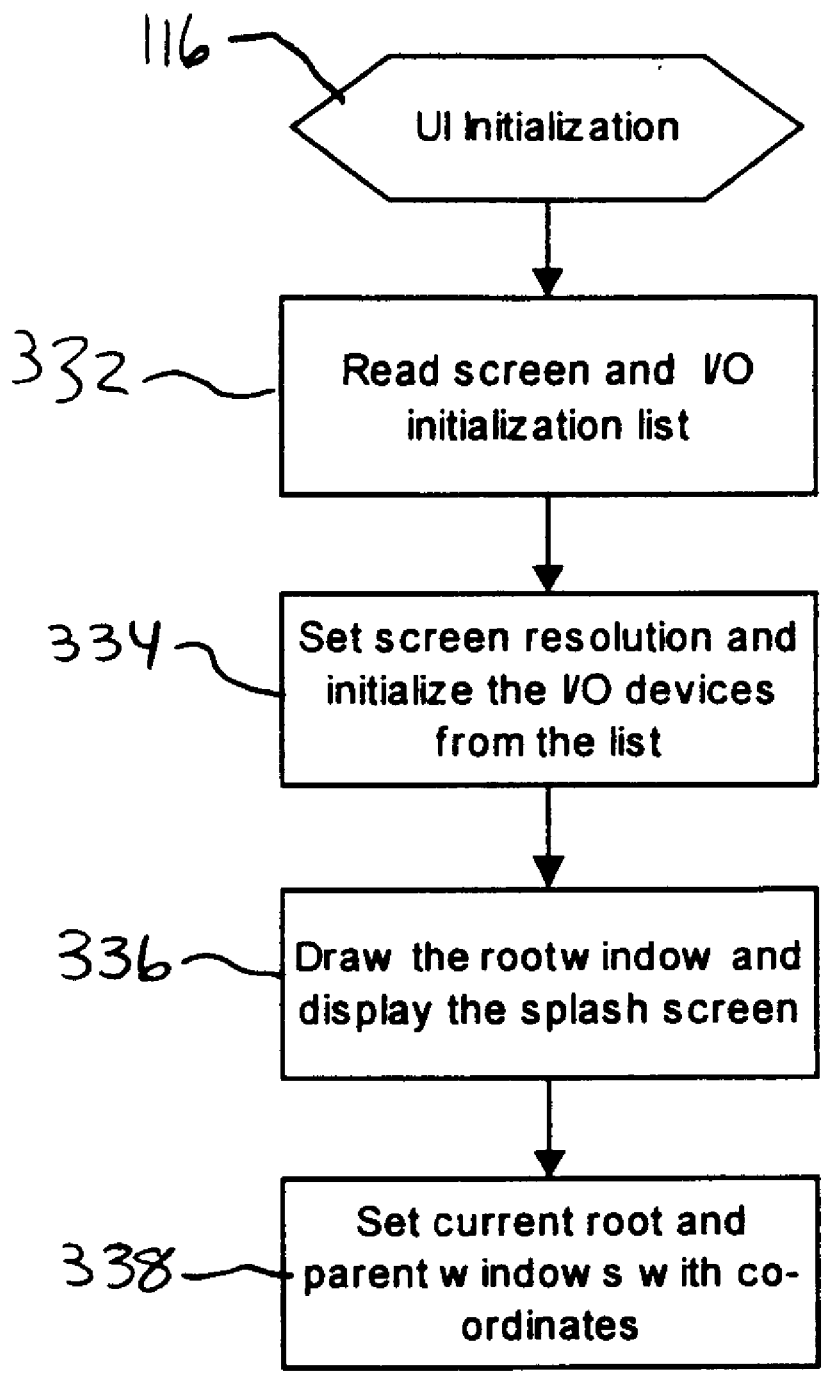
FIG. 16 is a flow chart illustrating the initialization performed by the UI agent of FIGS. 1 and 2.

The initialization of the system user interface is illustrated in FIG. 16 and, as indicated at 332, starts by reading a script file that contains information about the system input and output devices (I/O devices) and their settings. This script is generated during system installation and will contain information regarding screen resolution, the presence of a sound card, the configuration of the mouse, keyboard and other input devices. The screen resolution is then set and the I/O devices from the list are initialized during step 334. During the next steps in the UI initialization, 336 and 338, the control agent prompts the UI agent to draw the root display window or the main display window within which the tutoring/role-playing/testing will take place. This information regarding the placement of the root window is a global variable that is set and must be respected by all agents wanting to display information to the user, that is, information cannot be physically displayed outside this window.

Figure 17:
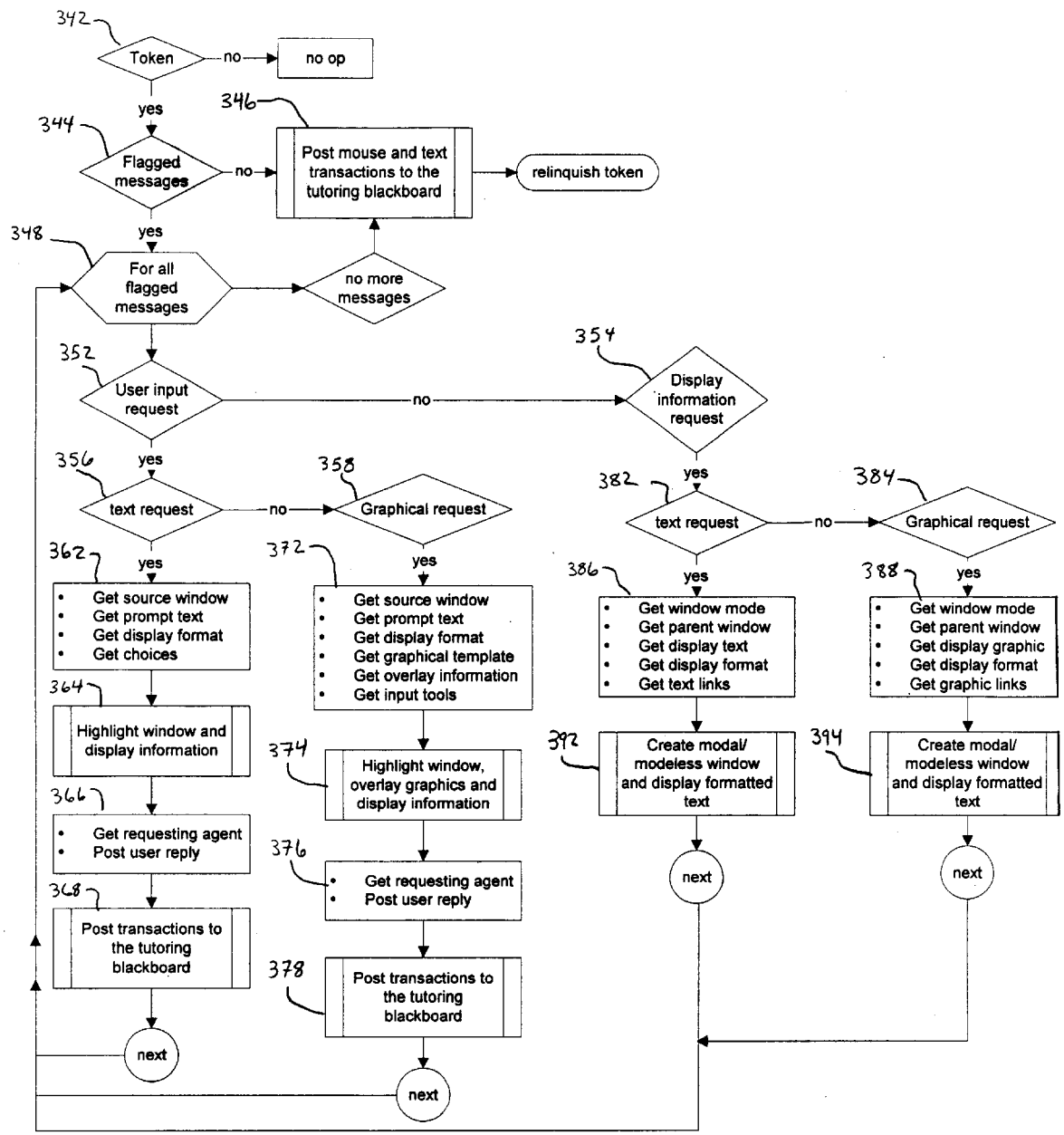
FIG. 17 is a flow chart illustrating the processing performed by the UI agent of FIGS. 1 and 2.

FIG. 17 illustrates the operation of the UI agent. When the control token is passed to the user interface agent, 342, the UI agent checks it's blackboard for any flagged events (or events that it has not seen) at 344. In the case that there are no such events, as indicated at 346, the UI agent posts a message to its blackboard for delivery to the tutoring agent blackboard regarding the student's activity (mouse, text, etc.) since the last time that it (the UI agent) had received the control token.

In the case of flagged messages or events 348, the events can be basically categorized into two kinds: a user input request event 352 and a display information request event 354. A user input request event 352 occurs when the system requests that a user provide an input to the system. A display information request event 354 occurs when information is to be displayed to the user.

In the case of a user input request event, the information can again be categorized into two basic types: a request for a textual input from the user 356 or a request for a graphical input from the user 358. In the case of textual information being requested to be entered by the user, as illustrated at 362, the UI agent identifies, from the posted message on it's blackboard, which window the user input should be entered into, the text that should be displayed in the window and the choices or format whereby input is requested. The window is then highlighted and the appropriate information is displayed therein as illustrated at 364. The user then provides his or her textual input which is posted as an event on the UI agent's blackboard for delivery to the blackboard of the agent requesting the user input, as indicated at 366. Finally, the transaction is posted to the tutoring agent blackboard, as indicated at 368. The UI agent then proceeds with processing the next flagged message (general flag) on its blackboard.

The requested information may alternatively be graphical, 358, such as requesting the user to select a region on a particular graphic, highlight, fill-in or draw on a particular graphic, etc. As illustrated at 372, a window featuring the appropriate graphics and other requesting information, such as a text prompt, must be loaded. In addition, overlay information (a layer for the user input to be displayed over the existing graphic) and a set of graphic tools (selection tool, painting tool, etc.) must be loaded. Next, in step 374, the window is highlighted, and the window with graphics and text prompts, overlay graphics and graphic tools are displayed. Once the user has entered the information on the overlay layer, this layer is recorded and the handle to this layer is posted to the requesting agent, as illustrated at 376. Finally, the transaction is posted to the tutoring agent blackboard, as indicated at 378. The UI agent then proceeds with processing the next flagged message (general flag) on its blackboard.

Information that is posted on the UI blackboard with the intention of simple display 354 may also be categorized as textual 382 or graphical 384 in nature. As illustrated at 386 and 388, regardless if the new screen content is textual or graphical, the parent window within which to display the new screen content and the mode of the new screen content must be retrieved from the training/testing data repository using information from the message posted to the UI agent blackboard. The text (392) or graphic (394) is then displayed. In either instance, if the new screen content is modal, then the new window (with the new screen content) is bounded by it's parent window, that is the user cannot drag the window with the new information beyond it's parent window's boundaries. If the information is modeless, then the user may drag the window to any location on the screen.

Additional items of information that are obtained from the message posted to the UI agent blackboard are the tags to the information that is the new content to be displayed. In the case of textual information, these tags (text links in 386) will include information on which pieces of text the user can ask questions (such as why, why-not, what-if, etc.). This information originates from the domain-dependent agent that is posting the message to the UI agent. In the case of graphics the graphic links (388) are in the form of an overlay file, in which if the user moves the mouse over certain regions, information will be displayed (e.g. highlighting the specific region) on which similar type of questions can be asked by the user.

Figure 18:
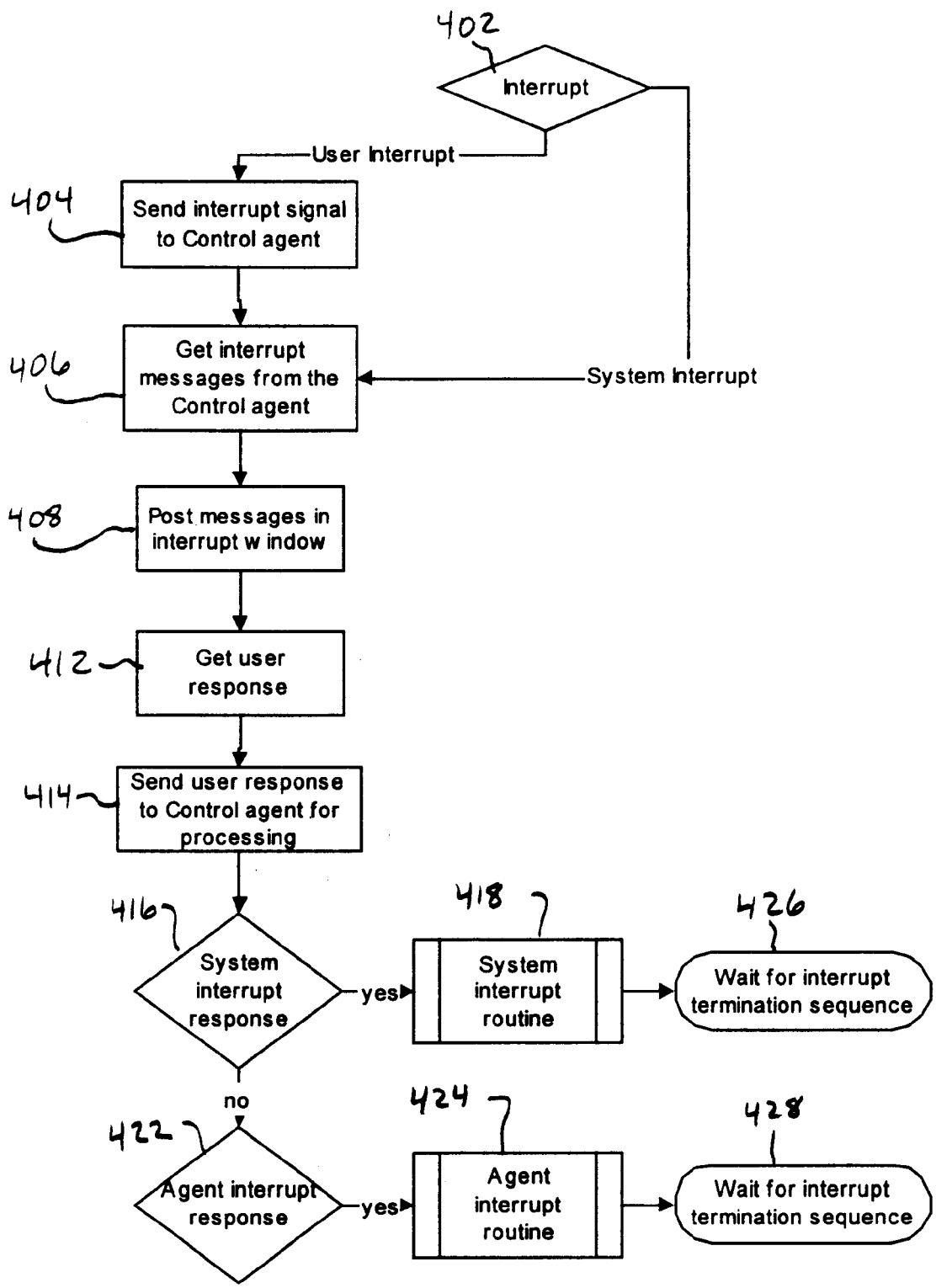
FIG. 18 is a flow chart illustrating the handling of user interrupts by the UI agent of FIGS. 1 and 2.

As described previously with respect to the control agent and FIG. 11, there are two types of interrupts that can occur, a user initiated interrupt and a system generated interrupt. As illustrated in FIG. 18, when the user interrupts the system 402, the UI agent informs the control agent 404 about the interrupt. The interrupt is then processed by the control agent as illustrated in FIG. 11 and the control agent decides what information to post on the user display or interface. When this interrupt is generated by the system, the UI agent will receive an interrupt broadcast along with the interrupt information that needs to be posted, as indicated at 406. The interrupt information is then displayed, as indicated at 408.

Once the relevant information is posted, the UI agent waits for the user to respond 412 and then posts the response 414 to the control agent for it to be processed. As illustrated at 416, 418, 422 and 424, the UI agent then goes through a standard procedure of cleaning up the windows that were generated by the interrupt and refreshing the information that was behind these windows. The UI agent then waits (426 and 428) for the broadcast of the interrupt termination sequence from the control agent before it resumes operations.

Message Protocols

All agents (domain dependent or independent) are free to use any messaging protocol that they choose depending on the ease of information delivery. There are however a few guidelines that each agent preferably follows. Each message preferably contains at least the following pieces of information:

a) A "to" field that specifies the intended recipient of the message. This must be a valid entry in the global list of domain dependent or domain independent agents as registered with the control agent during the initialization process.

b) A "from" field that specifies the agents own name as registered during the initialization process.

c) An ID field that is internally generated by the source agent to enable indexing messages from it.

d) A time stamp that is either obtained by a request to the control agent in the case of domain independent agents, or the time stamp generated by the synchronization module internally by the domain dependent agents.

e) A priority field. This is either generated internally by the domain dependent agents or is reflected by the domain independent agents based on some message with a priority.

f) An information field. This field will contain the information that the message contains. This can be either data, handles to data, control codes, interrupt codes or any information that needs to be relayed.

g) Flag field. This field is a flag that is set whenever this message is posted and has not been "seen".

Since these protocols are independent of the system, there needs to be a translation schema that is present so that protocols between agents are not incorrectly translated. In order to ensure this fact, each agent protocol that contains information extraneous to these fields needs to be registered with the blackboard agent during initialization so that when the blackboard agent communicates the posted message to the destination agent (FIG. 12), it knows how to recompose the message.

Domain Dependent Agents

Figure 19:
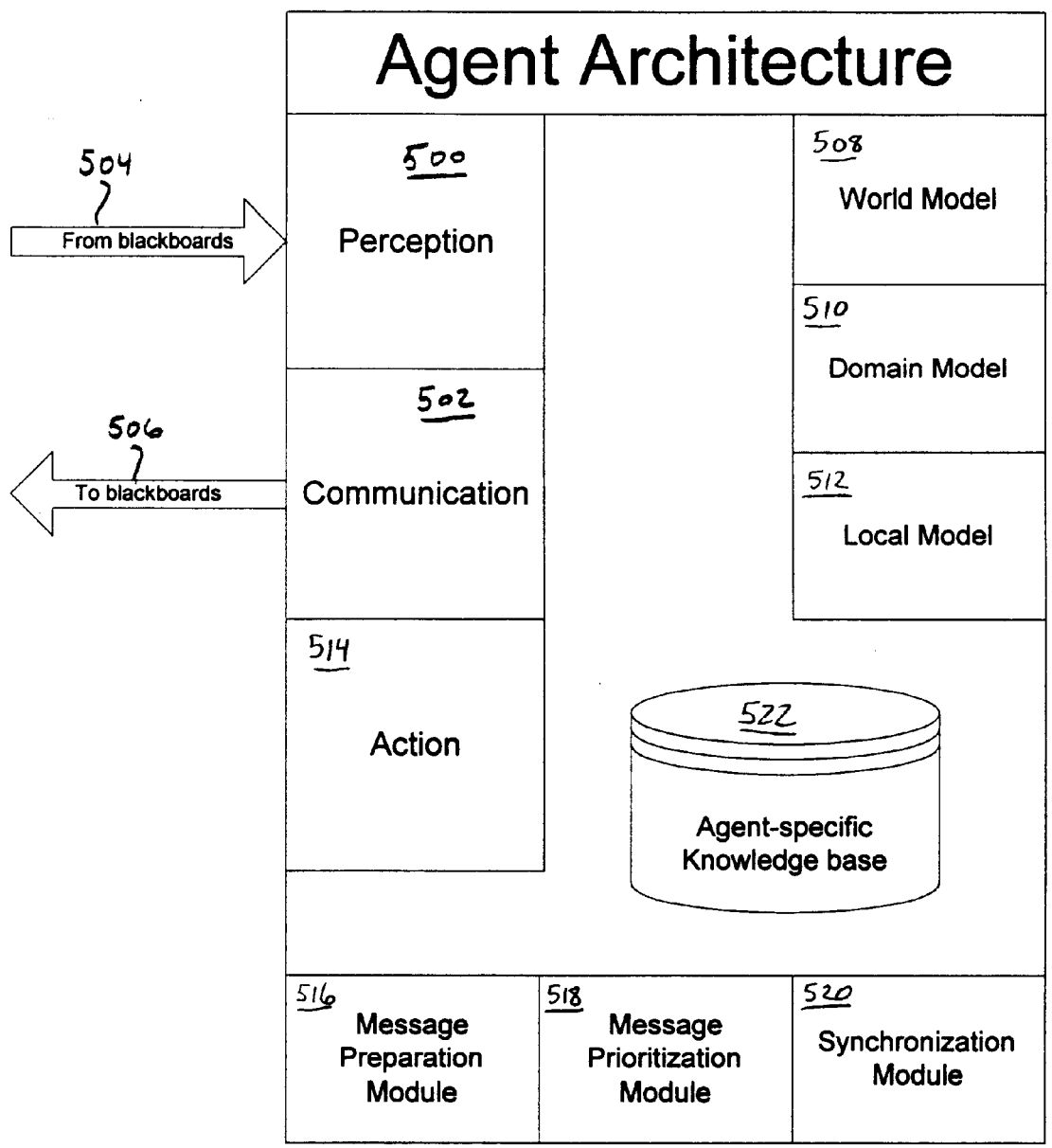
FIG. 19 is a schematic of the internal architecture for the domain dependent agents of FIG. 1.

Depending on the modality of application of the architecture of the present invention, the domain dependent agents, 22, 24, 26, 28 and 30 in FIG. 1, will vary. These agents capture the actual process involved in problem-solving and represent the different knowledge sources that interact. Each domain dependent agent is modular and self-sufficient and can be either active or passive during tutoring so that it can be interchanged with humans for role-playing. Independent of the modality, the general architecture of the domain specific agents may be constructed as illustrated in FIG. 19. It should be noted that domain dependent agent architectures other than the one illustrated in FIG. 19 could alternatively by employed with the architecture of the present invention.

The perception and communication modules, 500 and 502 in FIG. 19, respectively, in each agent handle the method of communication to and from the rest of the system. As such, the perception and communication modules are the only means through which the domain dependent agent has contact with the rest of the system. As described previously, each domain dependent agent features its own dedicated blackboard with which the perception and communication modules communicate, as illustrated by arrows 504 and 506.

Each domain dependent agent possesses three distinct models or state representations of the environment that they are immersed in. The world model 508 represents what the agent thinks the current state of the world (system) is in. This is developed based on the actions taken by the various agents. This model may not be a true representation of the world but it is what the agent thinks it is. As the process of tutoring (or problem solving) progresses, this model will be refined to reflect the intention and action of all the agents (and user) involved. The world model communicates with the perception and communication modules of the agent in order to obtain updates for its representation of the world/system.

The domain model 510 is a behavioral model of how the agent should perform in the domain. That is: Whom should it expect data from, whom is it's findings relevant to, how should it post/read this information, image/data conversion conventions etc. This model also reflects information pertaining to role-playing or testing modes.

The last model is the internal state of the agent and is modeled as the local model 512. This model represents all the information that the particular agent has processed and the current courses of action that it is considering. This state can be thought of as the entire workings of the particular agent in isolation, that is, without interactions with other agents. The model, however, does reflect all of the inputs that the agent receives.

Besides the communication to/from its blackboard, the domain dependent agent has an "action" module 514 that is in charge of deciding if an inference performed by the agent is something that should be communicated (posted to a blackboard) or not. As such, the action module serves in this respect as the "engine" or "brain" of the domain dependent agent.

As can be concluded, each message that an agent posts to some blackboard has to be carefully crafted, synchronized with the other messages on that blackboard and prioritized with respect to it's urgency in being assimilated by other agents. Some messages are routine and need to be addresses at regular intervals and some have an urgency that cannot be neglected before some other step is performed (or some period of time has elapsed). Some messages need to be attended to at once and therefore have a higher precedence. The preparation module 516, prioritization module 518 and synchronization module 520 handle all message controls. The basic composition of these modules preferably is the same for each domain dependent agent.

The heart of any agent is the knowledge it possesses. The agent specific knowledge base 522 contains this information. This is the information that guides the agent in reasoning about the current state and then choosing the best strategy to adopt. The knowledge could be in the form of a set of rules (that aid explanation) or could be as opaque as a neural network (that has been previously trained). This body of knowledge captures the essence of the SME (subject matter expert) and allows the agent to perform at their level of capability and competence. The knowledge base works independent of the other modules of the agent and relies only on the information they provide.

Multi-computer System

As stated previously, the architecture of the present invention may be employed in a system for problem solving or tutoring that uses more than one computer. Such a configuration permits geographically diverse users to simultaneously participate or role-play in a tutoring session or training scenario. In a multi-computer system, all of the architecture components listed in FIG. 1 are loaded onto each computer. The domain dependent and domain independent agents in a multi-computer system operate as described above with the following exceptions.

Only the control agent of the computer originating the tutoring session (the "primary" computer) operates and only the token of the primary computer is used. In addition, the domain independent and domain dependent agents of the remaining "secondary" computers are synchronized with the remaining domain independent and domain dependent agents of the primary computer. As a result, the actions of the secondary computer domain dependent and domain independent agents mirror those of the primary computer domain dependent and domain independent agents as they operate under the control of the primary computer control agent. As a result, the multi-computer system features centralized control via the primary computer.

"Role-play" flags are set for the domain dependent agents for which users have been substituted in a role-play training or tutoring scenario. When a domain dependent agent has a "role-play" flag set, it knows to keep quiet and do nothing so that the corresponding user may perform his or her role.

The domain independent and domain dependent agent global lists are maintained on the primary computer only and the machine name and ports for the domain dependent agents for which users have been substituted are loaded on the latter.

Conclusion

As can be seen, the architecture of the present invention can be utilized in any environment where there is a requirement for multiple knowledge sources and a close interaction between them in the problem solving process. This technology can be applied to a variety of tutoring and critiquing domains as well as be migrated into the problem solving process itself. This architecture offers a user-centric mode of teaching where the tutoring system caters to the specific needs of individual users rather than just being a repository for content.

The perception and communication modules of the domain dependent agents and their dedicated blackboards simplify the interaction of the domain dependent agents with the system. As a result, the architecture offers significant advantages in terms of modular implementation. For example, the system may initially be implemented as a stand-alone unit or "smart box" with all of the agents coded therein as software. As the technology becomes more trusted by users, it may be incorporated as hardware into machines, such as medical imaging machines. In other words, due to their modular-like construction, some domain dependent agents and their dedicated blackboards may be migrated into the machine as hardware while others remain encoded as software within the smart box. As a result, a phased implementation of a system employing the architecture may be utilized. Also a key to this architecture is the ability for modules to be removed or updated without any change to the rest of the system.

Furthermore, the modular-like construction of the domain dependent agents and their dedicated blackboards have numerous advantages in a tutoring application. For example, human users may be substituted for different domain dependent agents in the system. As a result, the users may "role play" with the system. There is also the ability for multiple users to assume different roles within the same tutoring system and interact with software/hardware agents as well as themselves, seamlessly. This is a key functionality because of the centralized shell with the possibility of distributed (TCP/IP) domain dependent agents.

This architecture of the present invention can be used for tutoring, problem solving, critiquing or just the capability of providing the subject matter experts with a reliable second opinion that the system can propose and explain.

While the preferred embodiments of the invention have been shown and described, it will be apparent to those skilled in the art that changes and modifications may be made therein without departing from the spirit of the invention.

What is claimed is:

1. An architecture for a computer system comprising:
   a) a plurality of domain dependent agents, each of said domain dependent agents including a knowledge base;
   b) a plurality of domain dependent agent blackboards, one of each of said plurality of domain dependent agent blackboards dedicated to one of each of said plurality of domain dependent agents;
   c) a blackboard agent, said blackboard agent transferring messages to and from said plurality of domain dependent agent blackboards;
   whereby said plurality of domain dependent agents may communicate with one another by posting messages to and reading messages from their dedicated blackboards.

2. The architecture of claim 1 further comprising a control agent and a token, said control agent selectively passing the token between said plurality of domain dependent agents and said blackboard agent so that each of said plurality of domain dependent agents and said blackboard agent function only when they have the token.

3. The architecture of claim 1 wherein the computer system is for tutoring and further comprising a tutoring agent and a dedicated tutoring agent blackboard, said tutoring agent communicating with the domain dependent agents through the dedicated tutoring agent blackboard and the plurality of domain dependent agent blackboards and enabling a user of the computer system to select between the domain dependent agents for a tutoring session.

4. The architecture of claim 3 further comprising a database agent, a dedicated database agent blackboard and a database, said database agent providing data to said tutoring agent from said database through the dedicated database agent and dedicated tutoring agent blackboards and said database agent receiving data from said tutoring agent through the dedicated tutoring agent and dedicated database agent blackboards for posting on said database.

5. The architecture of claim 4 wherein the database is a student database so that actions of a user during the tutoring session may be recorded on the student database.

6. The architecture of claim 1 further comprising a user display, a graphical front-end, a user interface agent and a dedicated user interface agent blackboard, said user interface agent displaying upon the user display information from the domain dependent agent knowledge bases through the plurality of domain dependent agent blackboards, the dedicated user interface agent blackboard and the graphical front-end.

7. The architecture of claim 6 wherein said user interface agent also receives inputs from a user and directs them to appropriate domain dependent agents through the dedicated user interface agent blackboard and plurality of domain dependent agent blackboards.

8. The architecture of claim 1 wherein the plurality of domain dependent agents each communicate with their dedicated blackboards through transmission control protocol/internet protocol links.

9. The architecture of claim 1 wherein each domain dependent agent features a world model, indicating the state of the overall computer system, a domain model, directing how the agent should perform with respect to the computer system and a local model, indicating an internal state of the agent.

10. An architecture for a computer system comprising:
   a) a plurality of domain dependent agents, each of said domain dependent agents including a knowledge base;
   b) a plurality of domain independent agents;
   c) a plurality of blackboards, one of each of said plurality of blackboards dedicated to one of each of said plurality of domain dependent agents or domain independent agents; and
   d) means for transferring messages between said plurality of blackboards;
   whereby said plurality of domain dependent and domain independent agents may communicate with one another by posting messages to and reading messages from their dedicated blackboards.

11. The architecture of claim 10 wherein the means for transferring messages is a blackboard agent.

12. The architecture of claim 10 further comprising a token and wherein said domain independent agents include a control agent, said control agent selectively passing the token between said plurality of domain dependent and domain independent agents so that each of said plurality of domain dependent and domain independent agents functions only when it has the token.

13. The architecture of claim 10 wherein the computer system is for tutoring and the plurality of domain independent agents includes a tutoring agent and the plurality of blackboards includes a dedicated tutoring agent blackboard, said tutoring agent communicating with the domain dependent and domain independent agents through the dedicated tutoring agent blackboard and the plurality of blackboards and enabling a user of the computer system to select between the domain dependent agents for a tutoring session.

14. The architecture of claim 13 further comprising a database and wherein the plurality of domain independent agents includes a database agent and the plurality of blackboards includes a dedicated database agent blackboard, said database agent providing data to said domain dependent and domain independent agents from said database through the dedicated database agent blackboard and remaining plurality of blackboards and said database agent receiving data from said domain dependent and domain independent agents through the dedicated tutoring agent blackboard and remaining plurality of blackboards for posting on said database.

15. The architecture of claim 14 wherein the database is a student database so that actions of a user during the tutoring session may be recorded on the student database.

16. The architecture of claim 10 further comprising a user display and a graphical front-end and wherein the plurality of domain independent agents includes a user interface agent and the plurality of blackboards includes a dedicated user interface agent blackboard, said user interface agent displaying upon the user display information from the domain dependent agent knowledge bases through the dedicated user interface agent blackboard, remaining plurality of blackboards and the graphical front-end.

17. The architecture of claim 16 wherein said user interface agent also receives inputs from a user and directs them to appropriate domain dependent and domain independent agents through the dedicated user interface agent blackboard and remaining plurality of blackboards.

18. The architecture of claim 10 wherein the plurality of domain dependent agents and domain independent agents communicate with their dedicated blackboards through transmission control protocol/internet protocol links.

19. A method of communicating between first and second agents in a computer system architecture comprising the steps of:
   a) providing a first agent having a dedicated first agent blackboard;
   b) providing a second agent having a dedicated second agent blackboard;
   c) providing a blackboard agent;
   d) the first agent posting a message to the dedicated first agent blackboard;
   e) moving the message from the dedicated first agent blackboard to the dedicated second agent blackboard with the blackboard agent; and
   f) the second agent reading the message from the dedicated second agent blackboard.

20. The method of claim 19 further comprising the steps of:
   g) providing a control agent and a token;
   h) using the control agent to pass the token to the first agent;
   i) performing step d) while the first agent has the token;
   j) using the control agent to pass the token from the first agent to the blackboard agent;
   k) performing step e) while the blackboard agent has the token;
   l) using the control agent to pass the token from the blackboard agent to the second agent; and
   m) performing step f) while the second agent has the token.

* * * * *